United States Patent
Campagna et al.

(10) Patent No.: US 10,469,477 B2
(45) Date of Patent: Nov. 5, 2019

(54) KEY EXPORT TECHNIQUES

(71) Applicant: Amazon Technologies, Inc., Seattle, WA (US)

(72) Inventors: Matthew John Campagna, Bainbridge Island, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 14/675,614

(22) Filed: Mar. 31, 2015

(65) Prior Publication Data

US 2017/0006018 A1     Jan. 5, 2017

(51) Int. Cl.
| | |
|---|---|
| *H04L 29/06* | (2006.01) |
| *G06F 21/62* | (2013.01) |
| *H04L 9/08* | (2006.01) |

(52) U.S. Cl.
CPC ...... *H04L 63/0807* (2013.01); *G06F 21/6218* (2013.01); *H04L 9/088* (2013.01); *H04L 63/0435* (2013.01); *H04L 63/061* (2013.01); *H04L 63/062* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 4,868,877 A | 9/1989 | Fischer | |
| 4,918,728 A | 4/1990 | Matyas et al. | |
| 5,146,498 A | 9/1992 | Smith | |
| 5,201,000 A | 4/1993 | Matyas et al. | |
| 5,495,533 A | 2/1996 | Linehan et al. | |
| 6,240,187 B1 | 5/2001 | Lewis | |
| 6,253,323 B1 | 6/2001 | Cox et al. | |
| 6,546,492 B1 | 4/2003 | Walker et al. | |

(Continued)

FOREIGN PATENT DOCUMENTS

| | | |
|---|---|---|
| JP | H1041933 | 2/1998 |
| JP | 2000295209 | 10/2000 |

(Continued)

OTHER PUBLICATIONS

Bernstein et al., "The Poly1305-AES Message-Authentication Code," Lecture Notes in Computer Science, Department of Mathematics, Statistics, and Computer Science (M/C 249), The University of Illinois at Chicago, Feb. 21, 2005, 18 pages.

(Continued)

*Primary Examiner* — Henry Tsang
(74) *Attorney, Agent, or Firm* — Davis Wright Tremaine LLP

(57) ABSTRACT

A computer system performs cryptographic operations as a service. The computer system is configured to allow users of the service to maintain control of their respective cryptographic material. The computer system uses inaccessible cryptographic material to encrypt a user's cryptographic material in a token that is then provided to the user. The user is unable to access a plaintext copy of the cryptographic material in the token, but can provide the token back to the service to cause the service to decrypt and use the cryptographic material.

20 Claims, 12 Drawing Sheets

(56) References Cited

U.S. PATENT DOCUMENTS

| | | |
|---|---|---|
| 7,490,248 B1 | 2/2009 | Valfridsson et al. |
| 7,565,419 B1 | 7/2009 | Kwiatkowski et al. |
| 7,620,680 B1 | 11/2009 | Lamport |
| 7,774,826 B1 | 8/2010 | Romanek et al. |
| 7,877,607 B2 | 1/2011 | Circenis et al. |
| 7,894,604 B2 | 2/2011 | Nishioka et al. |
| 7,953,978 B2 | 5/2011 | Greco et al. |
| 8,024,562 B2 | 9/2011 | Gentry et al. |
| 8,024,582 B2 | 9/2011 | Kunitz et al. |
| 8,091,125 B1 | 1/2012 | Hughes et al. |
| 8,111,828 B2 | 2/2012 | Raman et al. |
| 8,140,847 B1 | 3/2012 | Wu |
| 8,245,037 B1 | 8/2012 | Durgin et al. |
| 8,261,320 B1 | 9/2012 | Serenyi et al. |
| 8,295,492 B2 | 10/2012 | Suarez et al. |
| 8,302,170 B2 | 10/2012 | Kramer et al. |
| 8,588,426 B2 | 11/2013 | Xin et al. |
| 8,607,358 B1 | 12/2013 | Shankar et al. |
| 8,713,311 B1 | 4/2014 | Roskind |
| 8,751,807 B2 | 6/2014 | Ma et al. |
| 8,804,950 B1 | 8/2014 | Panwar |
| 8,812,844 B2 | 8/2014 | Chambers et al. |
| 8,904,181 B1 | 12/2014 | Felsher et al. |
| 8,989,379 B2 | 3/2015 | Katar et al. |
| 9,031,240 B2 | 5/2015 | Yang et al. |
| 9,135,408 B2 | 9/2015 | Chu et al. |
| 2002/0076044 A1 | 6/2002 | Pires |
| 2002/0141590 A1 | 10/2002 | Montgomery |
| 2003/0081790 A1 | 5/2003 | Kallahalla et al. |
| 2003/0093694 A1 | 5/2003 | Medvinsky et al. |
| 2003/0131238 A1 | 7/2003 | Vincent |
| 2003/0163701 A1 | 8/2003 | Ochi et al. |
| 2003/0172269 A1 | 9/2003 | Newcombe |
| 2003/0188188 A1 | 10/2003 | Padmanabhan et al. |
| 2003/0217289 A1 | 11/2003 | Ammon |
| 2004/0009815 A1 | 1/2004 | Zotto et al. |
| 2004/0093499 A1 | 5/2004 | Arditi et al. |
| 2004/0107345 A1 | 6/2004 | Brandt et al. |
| 2004/0143733 A1 | 7/2004 | Ophir et al. |
| 2004/0193915 A1 | 9/2004 | Smith et al. |
| 2004/0223608 A1 | 11/2004 | Oommen et al. |
| 2005/0010760 A1 | 1/2005 | Goh et al. |
| 2005/0050317 A1 | 3/2005 | Kramer et al. |
| 2005/0066175 A1* | 3/2005 | Perlman ............... H04L 63/0428 713/176 |
| 2005/0120232 A1 | 6/2005 | Hori et al. |
| 2005/0165859 A1 | 7/2005 | Geyer et al. |
| 2005/0246778 A1 | 11/2005 | Usov et al. |
| 2006/0010323 A1 | 1/2006 | Martin et al. |
| 2006/0018468 A1 | 1/2006 | Toba et al. |
| 2006/0021018 A1 | 1/2006 | Hinton et al. |
| 2006/0204003 A1 | 9/2006 | Takata et al. |
| 2006/0206932 A1 | 9/2006 | Chong |
| 2006/0291664 A1 | 12/2006 | Suarez et al. |
| 2007/0033637 A1 | 2/2007 | Yami et al. |
| 2007/0050641 A1 | 3/2007 | Flynn et al. |
| 2007/0140480 A1 | 6/2007 | Yao |
| 2007/0180153 A1 | 8/2007 | Cornwell et al. |
| 2007/0230706 A1 | 10/2007 | Youn |
| 2007/0283446 A1 | 12/2007 | Yami et al. |
| 2008/0019527 A1* | 1/2008 | Youn ....................... H04L 9/083 380/278 |
| 2008/0025514 A1 | 1/2008 | Coombs |
| 2008/0046984 A1 | 2/2008 | Bohmer et al. |
| 2008/0082827 A1 | 4/2008 | Agrawal et al. |
| 2008/0084996 A1 | 4/2008 | Chen et al. |
| 2008/0091941 A1 | 4/2008 | Yonezawa et al. |
| 2008/0112561 A1 | 5/2008 | Kim |
| 2008/0127279 A1 | 5/2008 | Futa et al. |
| 2008/0172562 A1 | 7/2008 | Cachin et al. |
| 2008/0298590 A1 | 12/2008 | Katar et al. |
| 2008/0319909 A1 | 12/2008 | Perkins et al. |
| 2009/0025087 A1 | 1/2009 | Peirson, Jr. et al. |
| 2009/0034733 A1 | 2/2009 | Raman et al. |
| 2009/0158033 A1 | 6/2009 | Jeong et al. |
| 2009/0165076 A1 | 6/2009 | DeCusatis et al. |
| 2009/0245519 A1 | 10/2009 | Cachin et al. |
| 2009/0276514 A1 | 11/2009 | Subramanian |
| 2009/0300356 A1 | 12/2009 | Crandell |
| 2010/0008499 A1 | 1/2010 | Lee et al. |
| 2010/0014662 A1 | 1/2010 | Jutila |
| 2010/0017626 A1 | 1/2010 | Sato et al. |
| 2010/0138218 A1 | 6/2010 | Geiger |
| 2010/0211781 A1 | 8/2010 | Auradkar et al. |
| 2010/0303241 A1 | 12/2010 | Breyel |
| 2010/0316219 A1 | 12/2010 | Boubion et al. |
| 2010/0325732 A1 | 12/2010 | Mittal et al. |
| 2011/0022642 A1 | 1/2011 | deMilo et al. |
| 2011/0066847 A1 | 3/2011 | Christensen et al. |
| 2011/0072264 A1 | 3/2011 | McNulty |
| 2011/0099362 A1 | 4/2011 | Haga et al. |
| 2011/0116636 A1 | 5/2011 | Steed |
| 2011/0154057 A1 | 6/2011 | England et al. |
| 2011/0173435 A1 | 7/2011 | Liu et al. |
| 2011/0191462 A1 | 8/2011 | Smith |
| 2011/0213971 A1 | 9/2011 | Gurel et al. |
| 2011/0246765 A1 | 10/2011 | Schibuk |
| 2011/0258443 A1 | 10/2011 | Barry |
| 2012/0079289 A1 | 3/2012 | Weng et al. |
| 2012/0134495 A1 | 5/2012 | Liu |
| 2012/0140923 A1* | 6/2012 | Lee ....................... H04L 9/0894 380/45 |
| 2012/0191979 A1 | 7/2012 | Feldbau |
| 2012/0198042 A1 | 8/2012 | Dunbar et al. |
| 2012/0204032 A1 | 8/2012 | Wilkins et al. |
| 2012/0260094 A1 | 10/2012 | Asim et al. |
| 2012/0266218 A1 | 10/2012 | Mattsson |
| 2012/0272052 A1* | 10/2012 | Wichmann ............... G06F 21/10 713/150 |
| 2012/0290850 A1 | 11/2012 | Brandt et al. |
| 2012/0291101 A1 | 11/2012 | Ahlstrom et al. |
| 2012/0300936 A1 | 11/2012 | Green |
| 2012/0303961 A1 | 11/2012 | Kean et al. |
| 2012/0311675 A1 | 12/2012 | Ham et al. |
| 2012/0314854 A1 | 12/2012 | Waters |
| 2012/0323990 A1 | 12/2012 | Hayworth |
| 2013/0003966 A1 | 1/2013 | Ihle et al. |
| 2013/0031255 A1 | 1/2013 | Maloy et al. |
| 2013/0044878 A1 | 2/2013 | Rich et al. |
| 2013/0111217 A1 | 5/2013 | Kopasz et al. |
| 2013/0157619 A1 | 6/2013 | Di Luoffo et al. |
| 2013/0159732 A1 | 6/2013 | Leoutsarakos |
| 2013/0163753 A1 | 6/2013 | MacMillan et al. |
| 2013/0198521 A1 | 8/2013 | Wu |
| 2013/0316682 A1 | 11/2013 | Vieira |
| 2013/0326233 A1 | 12/2013 | Tolfmans |
| 2014/0012751 A1 | 1/2014 | Kuhn et al. |
| 2014/0122866 A1 | 5/2014 | Haeger et al. |
| 2014/0164774 A1 | 6/2014 | Nord et al. |
| 2014/0177829 A1 | 6/2014 | MacMillan et al. |
| 2014/0181513 A1 | 6/2014 | Marek |
| 2014/0229729 A1 | 8/2014 | Roth |
| 2015/0127710 A1 | 5/2015 | Ady et al. |

FOREIGN PATENT DOCUMENTS

| | | |
|---|---|---|
| JP | 2006120089 | 5/2006 |
| JP | 2007208887 | 8/2007 |
| JP | 2010087888 | 4/2010 |
| JP | 2014140132 | 7/2014 |
| KR | 101145766 | 5/2012 |
| WO | WO2011083343 | 7/2011 |
| WO | WO2014126813 | 8/2014 |

OTHER PUBLICATIONS

Bethencourt et al., "Ciphertext-Policy Attribute-Based Encryption," IEEE Symposium on Security and Privacy 2007, 15 pages.

Campagna et al., "Web of Trust Management in a Distributed System," U.S. Appl. No. 14/284,278, filed May 21, 2014.

IEEE, "Draft Standard for Identity-based Public-key Cryptography Using Pairings," IEEE P1363.3/D1, Apr. 2008, retrieved Sep. 22,

(56) References Cited

OTHER PUBLICATIONS 2015, from http://grouper.ieee.org/groups/1363/IBC/material/P1363.3-D1-200805.pdf, 85 pages.
International Search Report and Written Opinion dated Apr. 29, 2014, in International Patent Application No. PCT/US2014/015404, filed Feb. 7, 2014.
International Search Report and Written Opinion dated May 28, 2014, in International Patent Application No. PCT/US2014/15697, filed Feb. 11, 2014.
International Search Report and Written Opinion dated May 30, 2014, in International Patent Application No. PCT/US2014/015408, filed Feb. 7, 2014.
International Search Report and Written Opinion dated May 30, 2014, in International Patent Application No. PCT/US2014/015410, filed Feb. 7, 2014.
International Search Report and Written Opinion dated May 30, 2014, International Patent Application No. PCT/US2014/015414, filed Feb. 7, 2014.
Krawczyk et al., "HMAC-based Extract-and-Expand Key Derivation Function (HKDF)," Internet Engineering Task Force (IETF), May 2010, retrieved Sep. 22, 2015, from https://tools.ietf.org/html/rfc5869, 14 pages.
Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.
Roth et al., "Device Coordination," U.S. Appl. No. 13/916,915, filed Jun. 13, 2013.
Roth et al., "Session Negotiations," U.S. Appl. No. 13/916,964, filed Jun. 13, 2013.
Sieloff, "The new systems administrator: The role of becoming root," Inside Solaris, Oct. 2002, 8(10):6-9.
Wikipedia, "IEEE P1363" an Institute of Electrical and Electronics Engineers (IEEE) standardization project for public-key cryptography, retrieved Sep. 22, 2015, from https://en.wikipedia.org/wiki/IEEE_P1363, 3 pages.
Wikipedia, "Key derivation function," retrieved Sep. 22, 2015, from https://en.wikipedia.org/wiki/Key_derivation_function, 4 pages.
Campagna, M.J., et al., "Distributed System Web of Trust Provisioning," U.S. Appl. No. 14/486,741, filed Sep. 15, 2014.
Menezes, A., et al., "Handbook of Applied Cryptography," CRC Press, Inc., 1996, Chapter 13, "Key Management Techniques," pp. 543-590.
International Search Report and Written Opinion dated May 20, 2016, in International Patent Application No. PCT/US2016/024302, filed Mar. 25, 2016, 12 pages.
Australian First Examination Report, dated Apr. 27, 2018, for Application No. 2016243115, 4 pages.
Singapore Written Opinion, dated May 15, 2018, for Patent Application No. 11201707796P filed Mar. 25, 2016, 6 pages.
Canadian Office Action for Patent Application No. 2,980,590 dated Jul. 30, 2018, 3 pages.
Japanese Office Action for Patent Application No. 2017-549404, dated Oct. 23, 2018, 5 pages.
Korean Notice of Preliminary Rejection for Patent Application No. 10-2017-7030633 dated Dec. 24, 2018, 6 pages.
Australian Notice of Acceptance dated Apr. 5, 2018, for Patent Application No. 2016243115, filed Jan. 25, 2019, 3 pages.
Japanese Decision on Grant for Patent Application No. 2017-549404 dated Jan. 15, 2019, 2 pages.
Korean Decision of Patent Grant for Patent Application No. 10-2017-7030633 dated Feb. 27, 2019, 3 pages.
Singapore Notice of Eligibility for Grant and Supplementary Examination Report, dated Mar. 14, 2019, for Patent Application No. 11201707796P, 7 pages.
Canadian Office Action, dated May 30, 2019, for Patent Application No. 2,980,590, 3 pages.

\* cited by examiner

| Export Domain Key ID 302 | Expiration 304 | Key 306 |
|---|---|---|
| 31415926 | 2015:03:24:00:00 | 🔑 |
| 31415927 | 2015:03:25:00:00 | 🔑 |
| 31415928 | 2015:03:26:00:00 | 🔑 |
| 31415929 | 2015:03:27:00:00 | 🔑 |

...

| 31416291 | 2016:03:23:00:00 | 🔑 |

FIG. 3

KEY EXPORT TECHNIQUES

BACKGROUND

For many users of data, the security of the data is of high importance in many contexts. Numerous techniques, such as encryption, have been well developed to ensure the security of data, such as by preventing unauthorized entities from obtaining data in plaintext form. At the same time, computer systems have become more and more complex as the needs of organizations develop. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

To assist organizations develop complex computer systems to support their operations, many organizations have begun hosting computing resources as a service. Computing resource services, for example, can be hosted to perform various operations on behalf of customers, such as computing, data storage, advanced data storage (e.g., using databases), networking services (e.g., hosted computer networks), and the like. While such services provide customers of providers of the services many advantages (e.g., the ability to set up computing resources without a large capital investment), customers often have concerns about data being accessible to other entities, regardless of the substantial efforts that service providers take to protect their customers' data.

BRIEF DESCRIPTION OF THE DRAWINGS

Various embodiments in accordance with the present disclosure will be described with reference to the drawings, in which:

FIG. 3 shows an illustrative example of a data structure in accordance with an embodiment;

DETAILED DESCRIPTION

Figure 1:
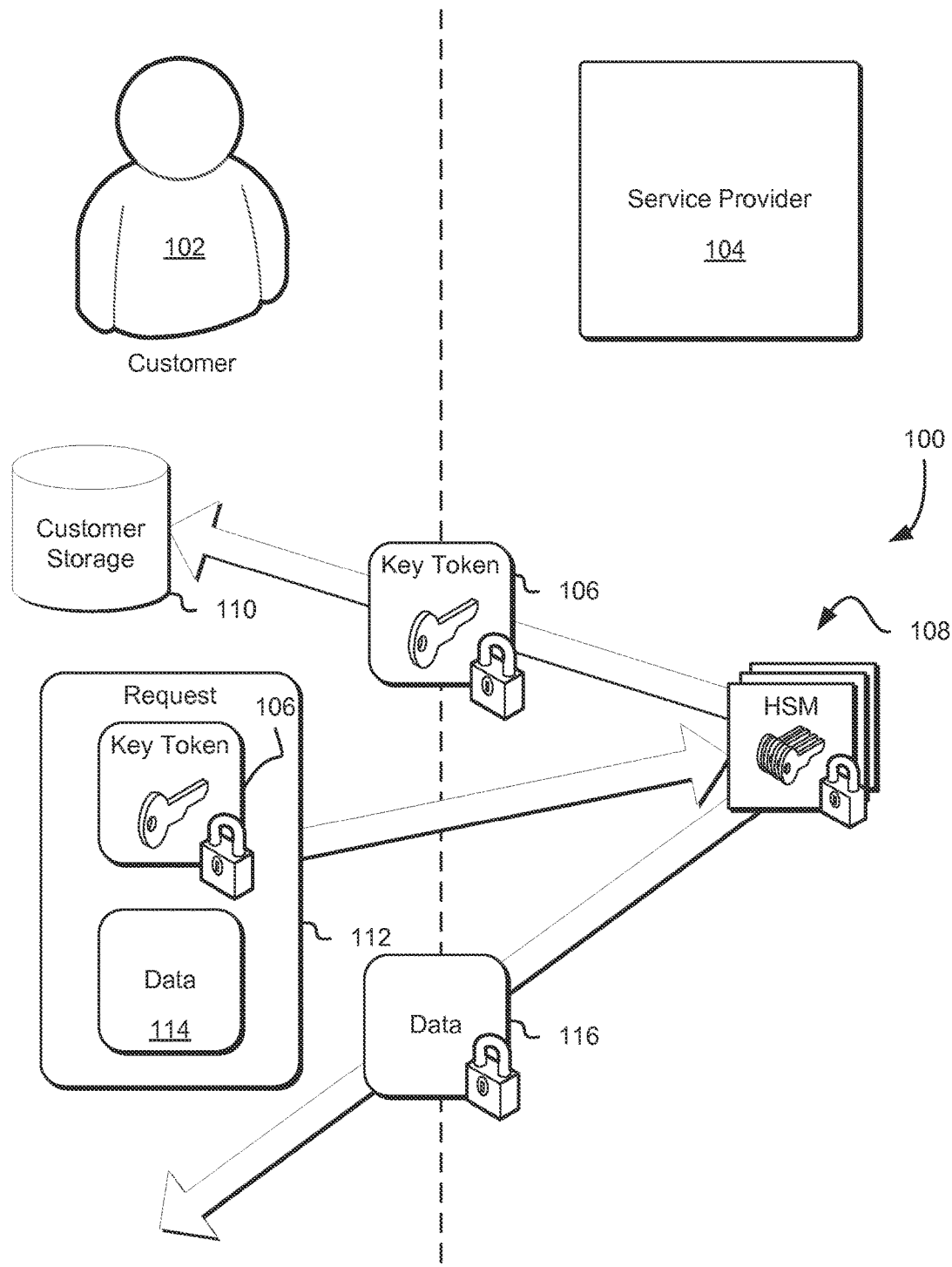
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include operating a distributed computer system with an application programming interface (API) that allows customers of a service provider to utilize a cryptography service while limiting service provider access to cryptographic keys provisioned for the customers. In an embodiment, a service provider operates a cryptography service that performs cryptographic operations (e.g., encryption, decryption, and digital signature generation and verification) on behalf of customers. The cryptography service may utilize specialized hardware, such as hardware security modules, to ensure the security of data with which the cryptographic operations are performed and the cryptographic keys used to perform the cryptographic operations. In some examples, an API of the cryptography service of the service provider is configured to enable the submissions of requests involving cryptographic keys to which the service provider has limited access.

For example, in an embodiment, the API is configured such that a request (e.g., web service request) can specify a cryptographic key to utilize in performing a cryptographic operation in multiple ways. In one example, a request to perform a cryptographic operation includes an identifier of a cryptographic key managed by the cryptography service (a hosted customer key also referred to as a managed customer key). In another example, a request to perform a cryptographic operation includes a token (referred to as an export key token) that comprises an encrypted copy of the cryptographic key to use in performing the cryptographic operation where the copy of the cryptographic key is decryptable using another cryptographic key (referred to as a wrapping key or an export domain key) that is maintained as a secret inside of one or more devices (e.g., hardware security modules or other devices providing hardware-based protection of cryptographic material) at the service provider.

To process a request to perform one or more cryptographic operations, the service provider may obtain the cryptographic key specified in the request. In the example of the request specifying a hosted customer key, the service provider may obtain an encrypted copy of the specified hosted customer key from data storage and provide the encrypted copy of the specified hosted customer key to a hardware security module for decryption and performance of the requested cryptographic operation(s). In the example of the request including or otherwise specifying an export key token, the export key token may be provided to a hardware security module for decryption of the export key token to obtain the customer key and perform the requested cryptographic operations(s). In at least the example where the request specifies an export key token, once use of the customer key has completed (e.g., as a result of providing a response to the request), the service provider may lose access to the customer key that was obtained from the export key token, thereby preventing the service provider from accessing the customer key unless provided in another communication (e.g., request) that includes the export key token or another export key token that contains the customer key. Note that losing access to the customer key may include losing access to any information from which the customer key can be determined, such as the export key token.

In various embodiments, a cryptography service uses at least two classes of domain keys, one class for hosted customer keys and another class for exported customer keys. In this manner, different class domain keys can be rotated (e.g., replaced to avoid cryptographic key exhaustion) according to different rotation schedules. As an example, because the service provider has access to hosted customer keys (each of which may be stored encrypted under a current domain key), the service provider can rotate the domain key more frequently than for export domain keys without causing a loss of customer data. In particular, the service provider can access an encrypted customer key, use an expiring domain key to decrypt the customer key, use the new domain key to encrypt the customer key, and store the encrypted customer key. However, for exported customer keys, rotation of the export domain key can cause a loss of customer data if the customer does not provide the export key token for re-encryption to the new export domain key.

Different rotation schedules for different classes of domain key, in various embodiments, enables flexible operations for cryptographic key lifetimes. In some implementations, an API of a cryptography service allows a customer to specify a lifetime for an exported customer key. Further, the service provider may maintain a set of export domain keys, each with a different expiration. The service provider may use an export domain key from the maintained set that matches the customer-specified lifetime to encrypt the customer key that will be provided to the customer in an export key token. Once the export domain key expires and is no longer accessible to the service provider, the export key token is no longer available to the service provider to decrypt the export key token and, as a result, the export key token is no longer usable to obtain the customer key. In this manner, the customer can ensure that data is accessible only for a limited time. Other variations are also considered as being within the scope of the present disclosure.

FIG. 1 shows an illustrative example of an environment 100 in which various embodiments can be practiced. In the illustration of FIG. 1, the environment 100 is presented to illustrate interactions between a customer 102 of a service provider 104. The service provider may be an entity that operates a computer system, which may be a distributed computer system, that is configured to provide one or more services, such as a cryptography service described in more detail below. In some examples, the service provider 104, in addition to a cryptography service, provides other services, such as services classified as infrastructure as a service where the service provider hosts hardware that customers of the service provider can remotely and programmatically manage. Note that, while a service provider and customers of the service provider are used for the purpose of illustration, the techniques described herein are applicable in other contexts where there is not a customer/service provider relationship.

In the example of FIG. 1 in an embodiment, the customer 102 receives from the service provider 104 a key token 106. The key token 106 may be a structured collection of information that includes a cryptographic key that is un-decryptable by the customer 102 (i.e., un-decryptable absent extraordinary computational effort). Other information such as one or more identifiers may be included in the key token 106. Key tokens are discussed in more detail below in connection with FIG. 4. In the example illustrated in FIG. 1, the key token is at least partially generated within a hardware security module of a fleet of hardware security modules 108 of the service provider 104 or another device that provides hardware-based protection of cryptographic material, such as described in more detail below. Note that while hardware security modules (HSMs) are used throughout for the purpose of illustration other devices, which provide hardware based protection of cryptographic material, may also be used. Examples of such devices include trusted platform modules (TPMs) and processors that include secure execution in environments such as an enclave of a processor utilizing Intel Secure Guard eXtensions (SGX) technology.

The hardware security module involved in generating the key token 106 may generate a cryptographic key for the customer 102 and encrypt that cryptographic key using another cryptographic key, referred to as a domain key, which is maintained securely within the fleet 108 of hardware security modules. For instance, each security module of a set of security modules may maintain a domain key as programmatically unexportable information. Information may be said to be programmatically unexportable if there is no legitimate way to programmatically cause (e.g., through an interface of the device) the device to provide the information. The information may be maintained, for example, such that there is no request mechanism (e.g., application programming interface (API) call) for causing hardware, with access to the information in plaintext form, to reveal the information in plaintext form. As an example, the security module may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. As a result, absent extraordinary computational effort, a device lacking access to the domain key used to encrypt the cryptographic key for the customer 102 inside of the key token 106 are unable to obtain the cryptographic key inside of the key token 106 in plaintext form.

Having received the key token 106 from the service provider 104 the customer may maintain a copy of the key token 106 in a storage device 110 managed by the customer. The storage device 110 may be, for example, a storage device in a private network managed by the customer 102 or generally any storage device over which the customer has control or which an entity other than the customer has control for the benefit of the customer 102.

The customer 102 may interact with the service provider 104 to utilize the key token 106 that it has stored. To do this, in an embodiment as illustrated in FIG. 1, the customer 102, through a computer device, provides a copy of the key token 106 in a request 112 to perform one or more cryptographic operations on data 114. The request 112 may be, for example, a web service request configured to cause the service provider 104 to perform the one or more cryptographic operations needed to fulfill the request 112. The data 114 may be any data the customer 102 desires to have operated upon by the service provider 104 by the performance of one or more cryptographic operations. In one example, the data 114 is a cryptographic key used by the customer 102 to encrypt other data. However, the scope of the present disclosure is not limited to the data 114 being a cryptographic key.

To process the request 112 the service provider 104 may provide the key token 106 or a portion thereof that includes the encrypted cryptographic key of the customer 102 to a hardware security module of the fleet of hardware security modules 108 that has access to a copy of a domain key useable to decrypt the encrypted cryptographic key. The hardware security module may decrypt the cryptographic key to obtain a copy of the cryptographic key in plaintext form and may use that copy of the cryptographic key in plaintext form to perform the requested one or more cryptographic operations on the data 114. In this particular example of FIG. 1, the data 114 is provided to the service provider 104 in plaintext form and the service provider, specifically a hardware security module of the service provider, performs an encryption operation on the data 114 to obtain encrypted data 116, which the service provider 104 provides back to the customer 102. Note, however, that while encryption is used in FIG. 1 and elsewhere herein, other cryptographic operations may be requested and subsequently performed. Such operations include for example decryption of encrypted data generation of digital signatures and verification of digital signatures and related operations such as verification of digital certificate authenticity.

Figure 2:
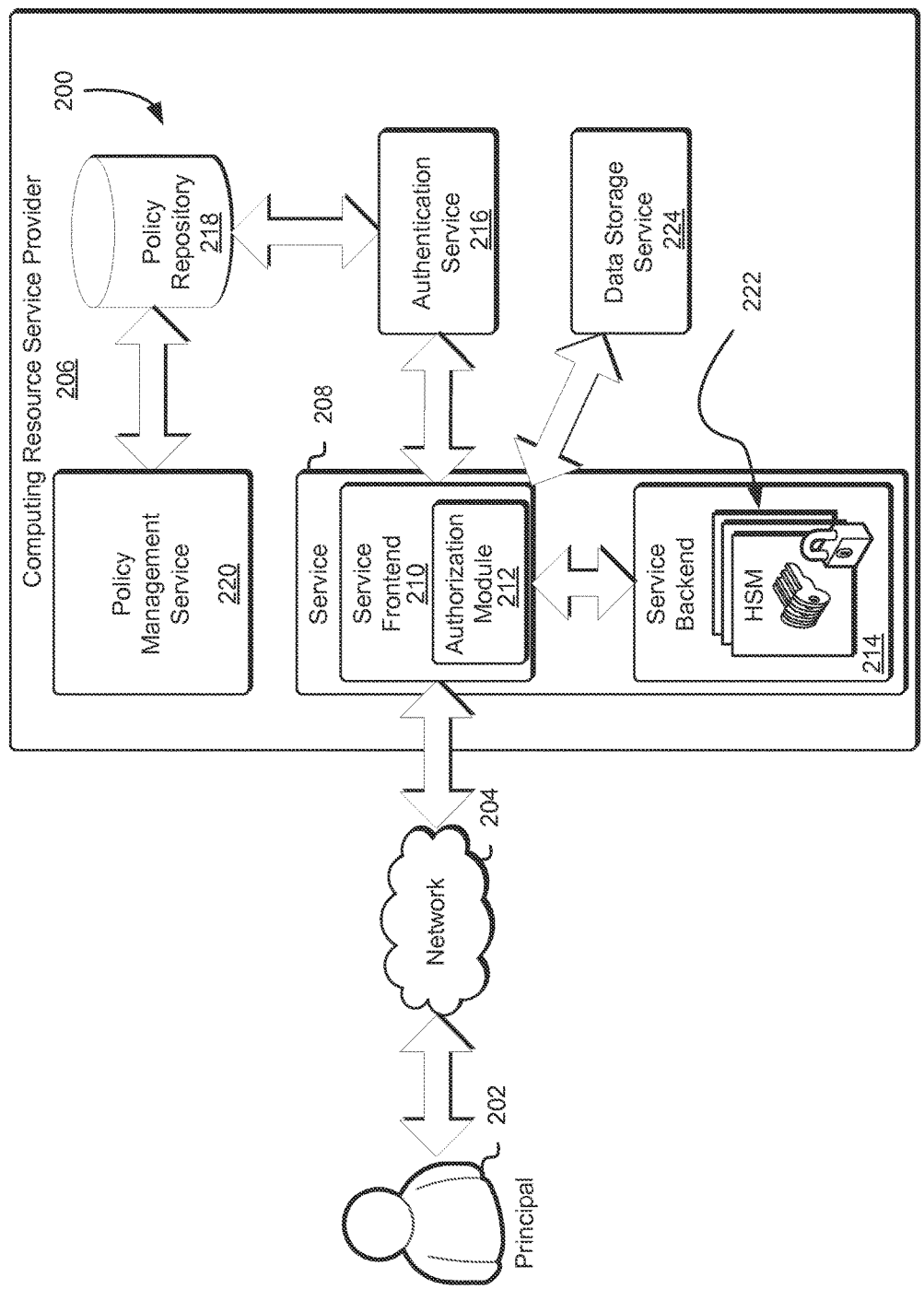
FIG. 2 shows an illustrative example of an environment in which various embodiments can be practiced.

FIG. 2 is an illustrative example of an environment 200 in which various embodiments of the present disclosure can be practiced. In an embodiment, a principal 202 may use a computing device to communicate over a network 204 with a computing resource service provider 206. Communications between the computing resource service provider 206 and the principal 202 may, for instance, be for the purpose of accessing a service 208 operated by the service provider 208, which may be one of many services operated by the service provider 206. The service may be a cryptography service, such as described in more detail in U.S. patent application Ser. No. 13/764,963, titled "Data Security Service," filed Feb. 12, 2013 and/or U.S. patent application Ser. No. 14/486,741, titled "Distributed System Web of Trust Provisioning," filed Sep. 15, 2014, which are incorporated herein by reference.

The service 208 may comprise a service frontend 210 and a service backend 214, which may be a component of the service configured to receive authorized requests from the service frontend 210 and configured to perform operations to fulfill such requests. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Generally, a principal is an entity corresponding to an identity managed by the computing resource service provider, where the computing resource service provider manages permissions for the identity.

The principal 202 may correspond to an identity managed by the computing resource service provider 206, such as by the policy management service or another service. The identity may be one of multiple identities managed for an account of a customer of the computing resource service provider, and the computing resource service provider may manage accounts for multiple customers. Note that, while the principal 202 may correspond to a human, such a human may communicate with the computing resource service provider 206 through a suitably configured computing device which may perform operations (e.g., generation and transmission of requests) on behalf of the principal 202. The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments. Note that such services and resources are provided for the purpose of illustration and embodiments of the present disclosure may utilize other services and/or resources.

The request for access to the service 208 which, in some examples, is a web service application programming interface request (also referred to simply as a web service request), may be received by a service frontend 210, which, in some examples, comprises a web server configured to receive such requests and to process them according to one or more policies associated with the service 208. The request for access to the service 208 may be a digitally signed request and, as a result, may be provided with a digital signature. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202. However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate. Generally, the authentication service may utilize a cryptographic key that is registered with the authentication service 216 in association with the principal 202.

Upon successful authentication of a request, the authentication service 216 may then obtain policies applicable to the request. A policy (also referred to as an access control policy) is a collection of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345. Access control policies may be maintained by the policy management service as policy documents, records in a database, access control lists (ACLs), or otherwise. A service (e.g., the service 208) may also maintain its own policies in addition to or instead of the policy management service.

A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220, which may be the policy management service discussed above in connection with FIG. 1. The query may be a request comprising information sufficient to determine a set of policies applicable to the request. The query may, for instance, contain a copy of the request and/or contain parameters based at least in part on information in the request, such as information identifying the principal, the resource, and/or an action (operation to be performed as part of fulfillment of the request). The policy repository, which may be a database or other system operable to process queries, may process the query by providing any policies applicable to the request. Note that, if authentication of the request is unsuccessful (e.g., because a digital signature could not be verified), policies applicable to the request may not be obtained.

Having obtained any policies applicable to the request, the authentication service 216 may provide an authentication response and, if applicable (e.g., when there is a positive authentication response), the obtained policies back to the service frontend 210. The authentication response may indicate whether the response was successfully authenticated. The service frontend 210 may then check whether the fulfillment of the request for access to the service 208 would comply with the obtained policies using an authorization module 212.

An authorization module 212 may be a process executing on the service frontend that is operable to compare the request to the one or more permissions in the policy to determine whether service is authorized to satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

In an embodiment, the service backend 214 includes a fleet of hardware security modules 222 or other security modules, such as described above. To process a request received by the service frontend 210 that requires the performance of a cryptographic operation by a hardware security module, the service frontend 210 may transmit a request to a hardware security module that specifies the operation to be performed, the cryptographic key to be used to perform the cryptographic operation, and, if applicable, the data on which the cryptographic operation should be performed (e.g., plaintext or ciphertext). The frontend 210 may select a hardware security module to perform the operation or another component (e.g., load balancer) may make the selection. Results of the performance of cryptographic operations may be provided from the hardware security module that performed the operation to the service frontend 210 so that the result may be provided in response to the respective requests.

In an embodiment, the computing resource service provider 206 includes a data storage service 206 which may be a computer system that provides an API to cause the data storage service to perform data storage operations (e.g., storing and retrieving data objects). The service frontend 210 may communicate with the data storage service to store cryptographic keys (e.g., hosted customer keys) that are encrypted by domain keys maintained within the hardware security modules 222. For example, when a request received by the frontend 210 requires use of a customer key, the frontend 210 may submit a request to the data storage service 224 to retrieve the customer key (encrypted under a domain key). The frontend 210 may receive the encrypted customer key and provide the encrypted customer key to a hardware security module for decryption and performance of the cryptographic operation. Similarly, when a hardware security module generates a new customer key (or rotates the domain key under which a customer key is encrypted), the hardware security module may encrypt the customer key using a domain key and provide the encrypted customer key to the frontend 210 which may, in turn, transmit a request with the encrypted customer key to the data storage service 224 for persistent storage thereby.

Note that, while FIG. 2 shows a particular configuration of a distributed system of a computing resource service provider, other configurations are also considered as being considered within the scope of the present disclosure. For example, authentication and authorization determinations may be made by different components of a distributed system (e.g., the service frontend 210). As another example, one or more hardware security modules or other devices providing hardware protection of cryptographic material may be hosted by an entity different from the computing resource service provider 206, such as by another service provider, or the customer itself. To cause such a hardware security module to perform cryptographic operations, a server in the service backend 214 may transmit messages over a network (e.g., the internet or over an internal network when the hardware security module is hosted in the same data center as the service backend 214). Such messages may be authenticated to enable the entity hosting the hardware security module to distinguish between authorized requests and unauthorized requests to perform cryptographic operations. In another example, the hardware security modules 222 are hosted by a separate service of the same computing resource service provider 206. For instance, the service 208 may provide services (e.g., virtual data storage devices or other services) that utilize the results of cryptographic operations. In such an example, inter-service API calls may be transmitted from one service to another service to cause the other service to perform cryptographic operations using the hardware security modules. Such calls may be made, for instance, by one service in accordance with a provisioning or other workflow that is performed to fulfill request from customers.

FIG. 3 shows an illustrative example of a data structure 300, which may be used to maintain a set of export domain keys in accordance with an embodiment. In an example of FIG. 3, the data structure 300 is a table, although other data structures are considered as being within the scope of the present disclosure. As illustrated in FIG. 3 the data structure 300 includes three columns, each column corresponding to different information about respective export domain keys. A first column 302 is used to record identifiers of export domain keys. Identifiers serve as references to export domain keys such that export domain keys used to encrypt cryptographic keys can be tracked. For example, an export key token may include an identifier of an export domain key used to encrypt the cryptographic key inside of the export key token. In this manner when an export key token is provided at another time, the appropriate export domain key may be identified (e.g., selected from a plurality of export domain keys) and accessed to decrypt the encrypted cryptographic key in the export key token. In this particular example, identifiers of export domain keys are sequence numbers. It should be noted however, that other types of identifiers may be used.

A second column 304 of the data structure 300 corresponds to expirations of respective export domain keys. As noted above, a cryptography service, at any given time, may have access to multiple export domain keys each with a different expiration such that export key tokens are usable for a specified amount of time before which an export domain key is destroyed and the export key token therefore becomes unusable as a mechanism for accessing the customer key encrypted in the export key token. In the illustrative example of FIG. 3, each entry in the second column 304 of the data structure 300 has an expiration that differs by 24 hours. In this manner, the data structure 300 records expirations for export domain keys that differ by 24 hours. Note however, that differing expirations by 24 hours are illustrative and that other expirations may be used. For example, successive expirations may differ by less than 24 hours or more than 24 hours and the difference between successive expirations is not necessarily uniform.

Note that each expiration of a respective export domain key may be enforced by at least one instance of an automated process that causes the export domain key to become inaccessible (e.g., permanently so) to all security modules that ever had access to the domain key at a time determined in accordance with the expiration. For example, each security module in a fleet of security modules may execute an instance of an automated process that irretrievably deletes domain keys upon occurrence of their expirations. The security module may be configured such that a remote attestation or other cryptographic proof of integrity of code for the automated process must be independently verified (e.g., by another security module or other computing device) before access to a domain key is provided. The security module may also be configured with anti-tampering mechanisms that cause the security module to lost access to domain keys as a result of tampering and also configured such that removing power to the module causes the security module to lose access to domain keys (e.g., because storage of domain keys is limited to volatile memory). Note the enforcement of expirations may be enforced by an automated process that is executed by another device. In such examples, the device executing the automated process may transmit commands to security modules to destroy domain keys (e.g., with the commands identifying the specific domain keys to destroy) in accordance with the expirations of the domain keys. Such an automated process may include the transmission of notifications or other operations if a security module does not fulfill a command to destroy a domain key.

A third column 306 in the data structure 300 is for the export domain keys corresponding to their respective export domain key identifiers and expirations in the same row. As an illustrative example, in the first data-containing row of the data structure 300, an export domain key stored in an entry in the third column 306 has an export domain key identifier of 31415926 and has an expiration of Mar. 24, 2015 at 12:00 a.m.

By using a data structure such as the data structure 300, export domain keys may be selected to allow for lifetimes of export key tokens that are specified by the customers or otherwise. For example, a customer may request a cryptographic key having the lifetime of 30 days. The data structure 300 may be used to locate an export domain key with an expiration that will allow for a lifetime of 30 days.

An export domain key may be selected as the export domain key with the highest lifetime that is less than or equal to the requested lifetime or, in alternate embodiments, the export domain key with the shortest lifetime that is greater than or equal to the requested lifetime. In some examples, whether export domain key is selected as the export domain key with the highest lifetime that is less than or equal to the requested lifetime or the export domain key with the shortest lifetime that is greater than or equal to the requested lifetime is a configurable setting, which may be selectable in a parameter of a request for an export key token.

It should be noted that the data structure 300 illustrated in FIG. 3 is provided for the purpose of illustration and numerous are considered as being within the scope of the present disclosure. For example, FIG. 3 shows particular types of information stored in a particular order. Different types of information and different orderings are considered as being within the scope of the present disclosure. As another example, FIG. 3 illustrates storage of an expiration value and an export domain key identifier for each export domain key. In alternate embodiments, the expiration of an export domain key may be used as the export domain key identifier and accordingly a column for export domain key identifiers may be omitted. Other variations are also considered as being within the scope of the present disclosure.

Figure 4:
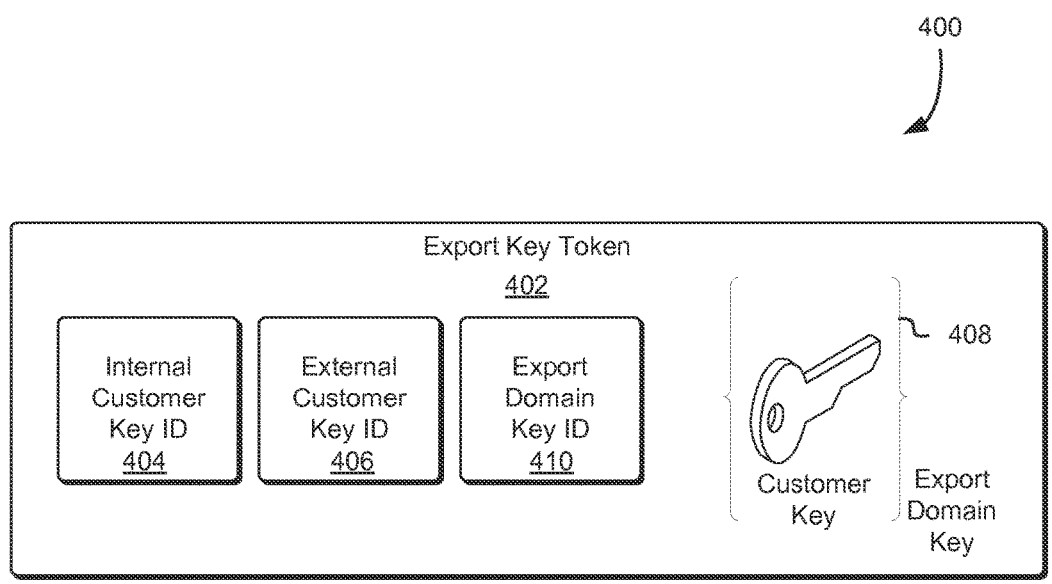
FIG. 4 shows an illustrative example of an export key token in accordance with an embodiment.

FIG. 4 shows a diagram 400 illustrating an example export key token 402 in accordance with various embodiments. As illustrated in FIG. 4, the export key token 402 includes various components. For example, in an embodiment, the export key token 402 corresponds to a customer key and to identify the customer key see export key token 402 may comprise a set of identifiers for the customer key. In this example, the export key token 402 includes an internal customer key identifier 404 and an external key identifier 406. The internal customer identifier 404 may be an identifier utilized by the customer for the customer key. Similarly, the external customer key identifier 406 may serve as an identifier for the customer key utilized by a service provider that generated the export key token 402. In an example embodiment, a request to the service provider from the customer for the customer key may include, as a parameter, the internal customer key identifier 404 that the customer will use for the customer key internally in its own computer systems. The external customer key identifier 406 may be generated by the service provider for use by the service provider, such as to enable the association of policy and other access control mechanisms with the customer key. It should be noted however, that export key tokens 402 may lack internal customer key identifiers 404 such as when customers do not specify an internal customer key identifier or when support for such identifiers is not provided. In some examples, the external customer key identifier 406 may serve as an internal customer key identifier and in such examples the external customer key identifier 406 may be repeated or a single component of the export key token 402 may be the external customer key identifier 406.

Further, as illustrated, in FIG. 4 in an embodiment the export key token 402 includes an encrypted copy 408 of the customer key encrypted under an export domain key. Accordingly, to enable identification of the particular export domain key used to encrypt the customer key for the export key token 402, the export key token 402 may include an export domain key identifier 410. In this manner, when the service provider receives the export key token 402, the service provider can use the export domain key identifier 410 to obtain the appropriate export domain key to decrypt the encrypted copy 408 of the customer key in the export key token 402.

Other information may also be included in the export key token 402. For example, a non-initialization vector or other information used for encryption of the customer key may be included in the export key token 402 although such information is not illustrated in the figure. As another example, the export key token 402 may include a digital signature of information contained in the export key token 402. The digital signature may enable the verification of integrity of the export key token 402. The digital signature may be used for example to verify that the external customer key identifier 406 and the export domain key identifier 410 and or other information including the encrypted copy 408 of the customer key have not been modified either inadvertently or maliciously. The digital signature may be generated using a cryptographic key accessible to the service provider such as a private cryptographic key maintained as a secret by the service provider or a symmetric cryptographic key maintained as a secret by the service provider. Generally, any authentication information useable by the service provider to verify integrity of some or all of the export key token 402 may be used.

Figure 5:
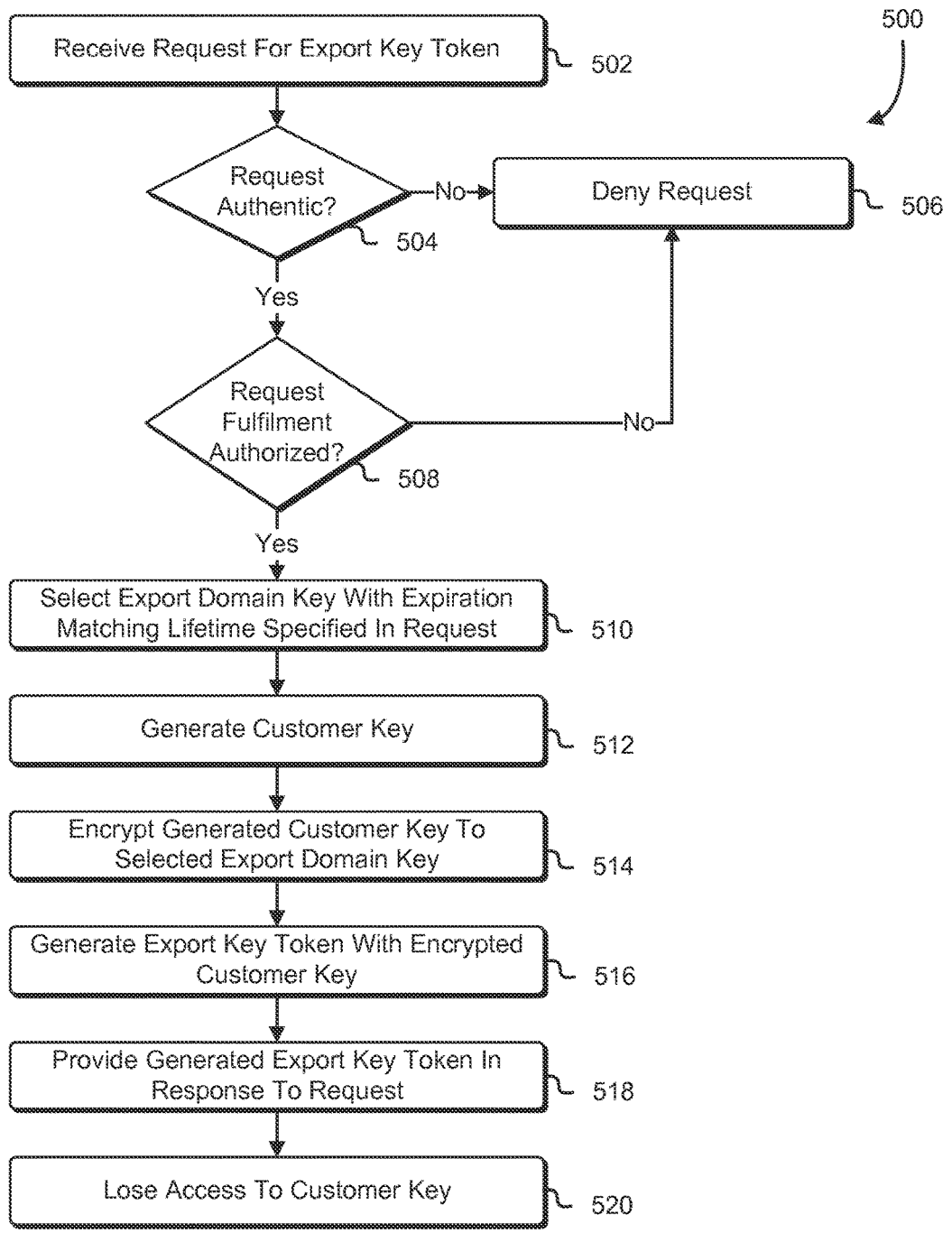
FIG. 5 shows an illustrative example of a process for fulfilling a request for an export key token in accordance with an embodiment.

As noted above, a cryptography service may allow customers to request export key tokens. FIG. 5 accordingly shows an illustrative example of a process 500 for processing a request for an export key token in accordance with an embodiment. The process 500 may be performed by any suitable system such as by a cryptography service discussed above. The performance of various operations involved in the performance of the process 500 may occur by different components of cryptography service, such as described in more detail below. In an embodiment, the process 500 includes receiving 502 a request for an export key token. The request 502 may be, for example, a web service request received from a computing device of a customer of the service provider whose system performs the process 500. The request may be received 502 by a suitable component of the cryptography service such as a web server.

To process the request that was received 502 the web server or another component of the cryptography service may determine 504 whether the request is authentic. Determination 504 of whether the request is authentic may be performed in various ways in accordance with various embodiments. In some examples, the request is digitally signed so as to be cryptographically verifiable. Accordingly, determining 504 whether the request is authentic may include verifying a digital signature of the request that was received 502. For example, a symmetric digital signature generated using a symmetric cryptographic key shared as a secret between the customer and the service provider or may be a private cryptographic key corresponding to a public cryptographic key that is provided or otherwise specified with the request, such as in a digital certificate corresponding to the private cryptographic key. An authentication service may be used to verify digital signatures, such as described above in connection with FIG. 2. In other examples, the request is received 502 over a cryptographically protected communications session such as a transport layer security (TLS) session. Establishment of the session may have required some type of authentication and consequently the fact that the request was received 502 over a cryptographically protected communications session indicates authenticity of the request. Generally, verification of authenticity of the request may be performed by using authentication information to verify that the request was submitted by an entity associated with the request.

If it is determined 504 the request is not authentic (i.e., if unable to verify authenticity of the request) the process 500 may include denying 506 the request. The request may be denied in various ways with various embodiments. In some examples, for instance a response to the request is provided that indicates the denial. As another example, no action may be taken and the request may be allowed to time out. Other operations may also be performed in connection with denial 506 of the request and such operations may depend on specific implementations of systems that perform the process 500.

If it is determined 504 that the request is authentic the process 500 may include a web server of the cryptography service or other component determining 508 whether a fulfillment of the request is authorized. Determining whether fulfillment of the request is authorized may be performed in various ways in accordance with various embodiments. Referring to FIG. 2 discussed above determining 508 whether fulfillment of the request is authorized may include verifying whether any policies applicable to the request allow for fulfillment of the request. Generally, a service provider may maintain conditions that control fulfillment of requests and verification 508 of whether the request fulfillment is authorized may include verifying whether such conditions allow for fulfillment of the request.

If it is determined 508 that request fulfillment is not authorized, the process 500 may include denying 506 the request such as described above. For instance, a web server that received 502 the request may transmit a message addressed to an address from which the request is specified as having been originated. If it is determined 508 that fulfillment of the request is authorized, a system performing the process 500 may perform a set of operations to fulfill the request. In this example the process 500 includes selecting 510 an export domain key that has an expiration that matches a lifetime specified in the request that was received 502. A web server or a security module may select the export domain key. The lifetime may be specified for instance as a parameter of the request or may be specified in other ways for example by default. The process 500 may also include generating 512 a customer key. A web server or other component of the system performing the process 500 may for instance transmit an instruction to a security module that causes the security module to generate 512 the customer key. The security module may utilize for instance a pseudorandom number generator or other mechanism (e.g., a key derivation function applied to information at least some of which is maintained as a secret) to generate 512 a customer key. Note that, while FIG. 5 shows generation 512 of a customer key as part of the process 500, customer key generation may be performed asynchronously with the process 500. For example, customer keys may be pre-generated and a pre-generated customer key may be obtained. In other examples, the request for the export key token includes a copy of the customer key that is to be encrypted in the export key token.

Once the customer key has been generated 512, the security module that generated 512 the customer key may encrypt 514 the generated customer key using the selected export domain key. The security module, for example, may access the selected export domain key from memory and input the generated customer key and the selected export domain key into a cryptographic algorithm that results in an encrypted copy of the generated customer key. Once an encrypted copy of the generated customer key has been obtained, a system performing the process 500 may generate 516 an export key token with the encrypted customer key.

The manner by which the export key token is generated 516 may vary in accordance with various embodiments. In some examples, the security module that generated and encrypted the customer key may additionally generated 516 the export key token and in other examples, the security module may provide a copy of the encrypted customer key to another server, such as a web server of the system performing the process 500 so that the server will use the copy of the encrypted customer key to generate 516 the export key token. Regardless of how generated 516, the export key token may be obtained to the web server that received 502 the request and the web server may provide 518 the generated export key token in response to the request.

Once the generated export key token has been provided 518, or at a time after the export key token has been generated 516, a system performing the process 500 may lose 520 access to the customer key. Access may be lost in various ways in accordance with various embodiments such as by overriding memory locations that store some or all of the customer key with different data such as zeros random data or non-random data or by reallocating memory in which some or all of the customer key is stored to be eventually overwritten as other data as a system performing the process 500 continues to operate. As noted above, access may be lost to other information from which the customer key can be obtained (e.g., any copies of the export key token). In this manner at some point, the service provider lacks access to the customer key and access to the customer key is thereby controlled by the customer, even in the unlikely event of a severe security breach at the service provider. For instance, the service provider cannot access the customer key unless the customer provides the export key token in a subsequent request or otherwise.

Figure 6:
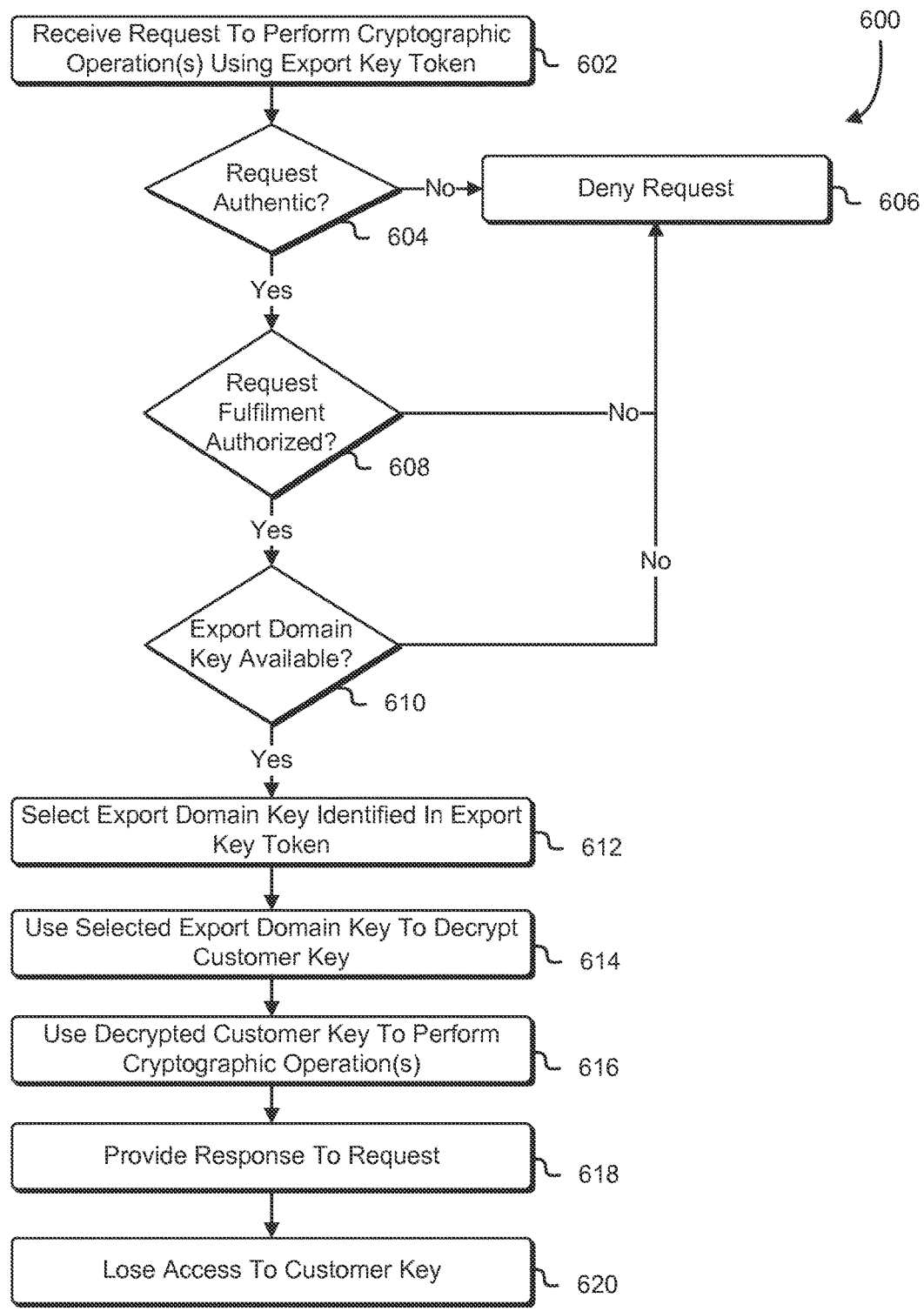
FIG. 6 shows an illustrative example of a process for fulfilling a request to perform one or more cryptographic operations using an export key token in accordance with an embodiment.

As noted above, customers of a service provider can provide export key tokens back to the service provider for the purpose of causing the service provider to perform cryptographic operations using cryptographic keys encrypted in the export key tokens. FIG. 6 shows an illustrative example of a process 600 for processing a request to perform a cryptographic operation using an export key token. The process 600 may be performed by any suitable system, such as by a cryptography service discussed above. Different components of the cryptography service may perform different operations as noted in more detail below. In an embodiment, the process 600 includes a receiving 600 a request to perform one or more cryptographic operations using an export key token. The request may include, for example, the export key token as a parameter of the request. As with all requests that are received from a customer, the request may be received 602 by a web server of a service frontend of the cryptography service performing the process 600. As discussed above in connection with FIG. 5, a system performing the process 600 may determine 604 whether the request is authentic, such as described above in connection with FIG. 2. If determined 604 that the request is not authentic (i.e., if unable to verify authenticity of the request) the request may be denied 606 such as described above. If, however, it is determined 604 that the request is authentic, the process 600 may include determining 608 whether fulfillment of the request is authorized. If it is determined 608 that fulfillment of the request is unauthorized or generally if it cannot be determined that the request has authorized the system performing the process 600 may deny 606 the request as described above.

If, however, it is determined 608 that fulfillment of the request is authorized a system performing the process 600 may determine 610 whether an export domain key is available. As noted above, customer keys may be encrypted for export key tokens using export domain keys that have expirations. When an export domain key expires, a cryptography service may perform a set of operations that could cause the cryptography service and generally the service provider to lose access to the export domain key. Accordingly, when a request to perform one or more cryptographic operations using an export key token is received the request may or may not be fulfillable depending on whether the export domain key used to encrypt the customer key inside of the export key expired and, as a result, the service provider has lost access to the export domain key. The determination 610 of whether an export domain key is available may be performed in various ways in accordance with various embodiments. In some examples, a web server used an identifier of the export domain key in the export key token to check whether the identifier occurs in a list or other data structure of active export domain keys. Such operations may also be performed by a security module.

If it is determined 610 that an export domain key is not available, because the export domain key has been expired and as a result the service provider has lost access to the export domain key. The system performing the process 600 may deny 606 the request such as described above. If, however, the system performing the process 600 and, in particular, this portion of the system determining 610 whether the export domain key is available determines that the export domain key is available, the system performing the process 600 may select 612 and export domain key identified in the export key token. The selection may occur by a web server that received 602 the request by a security module that stores export key tokens or otherwise. Having been selected 612, the export domain key can be used 614 to decrypt the customer key. A security module of a system performing the process 600 may be the component of the system that uses 614 the selected export domain key to decrypt the customer key.

Once the component of the system that uses 614 the selected export domain key to decrypt the customer key has access to the decrypted customer key, that component may use 616 the decrypted customer key to perform the one or more cryptographic operations that were requested. For example, a security module of a cryptography service may use the decrypted customer key to encrypt or decrypt data that is included specified in the request, such as by being included in the request or referenced in the request to enable retrieval of that data. As noted above, other cryptographic operations may be performed instead of, or in addition to, encryption and or decryption. For example, a digital signature included in the request with data over which the digital signature was purportedly generated and the one or more cryptographic operations may include verifying the digital signature. Other operations may include determining whether a digital certificate is trusted and performing one or more cryptographic operations using the digital certificate.

Having performed 616 the one or more cryptographic operations for fulfillment of the request that was received 602, a response to the request comprising one or more results of performance of the one or more cryptographic operations may be generated and provided 618 in response to the request. For example, a security module may provide one or more results of the one or more cryptographic operations to a web server of the system performing the process 600 that received 602 the request. The response may be provided to a network destination (e.g., Internet Protocol (IP) address) identified in the request as being a network destination from which the request originated.

Once the one or more cryptographic operations have been performed using the decrypted customer key and the decrypted customer key is no longer necessary to the system performing the process 600, the system performing the process 600 may lose 620 access to the customer key by performing a set of operations that causes the system to lose access to the customer key, such as described above.

Figure 7:
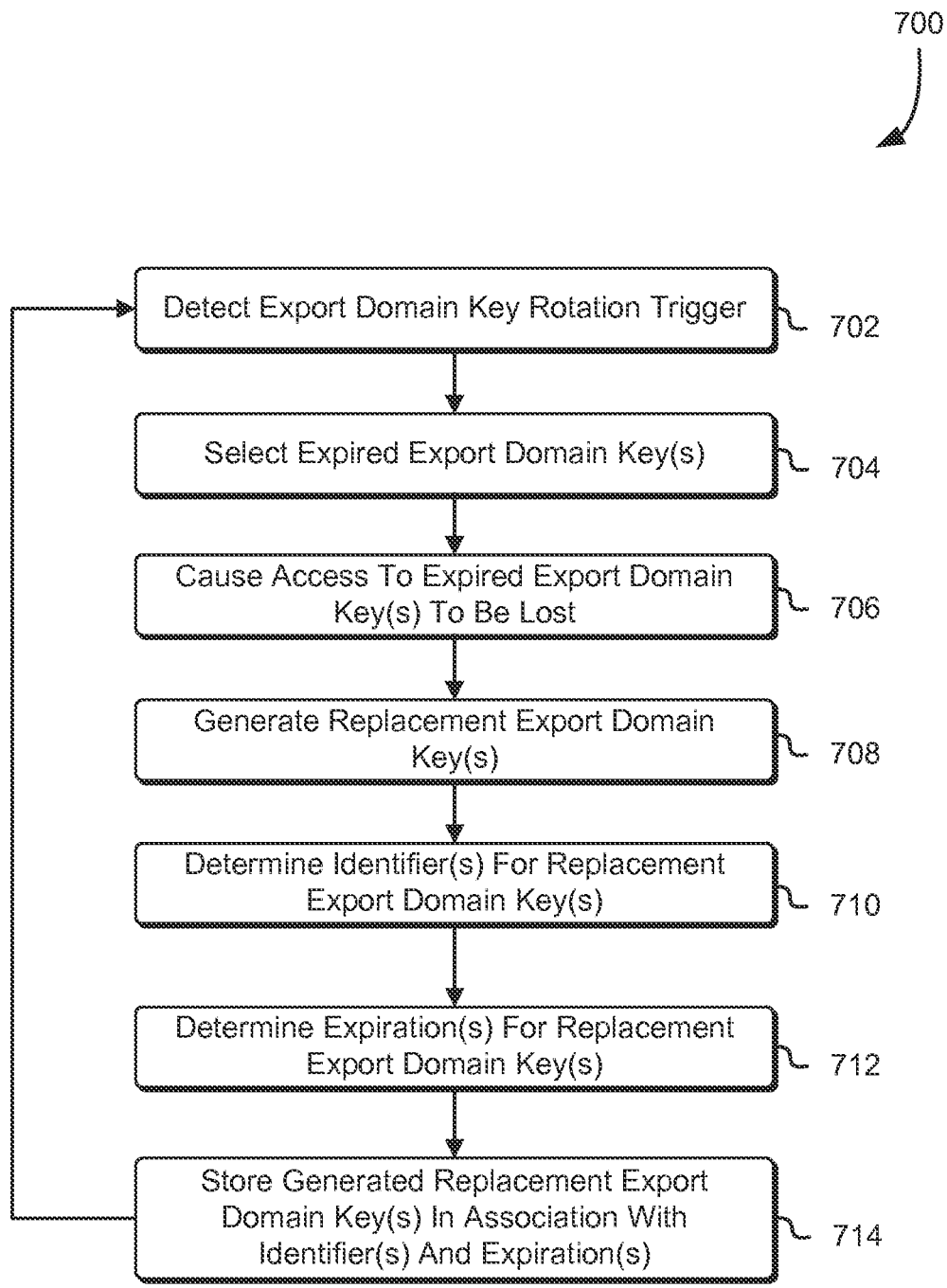
FIG. 7 shows an illustrative example of a process for rotating export domain keys in accordance with an embodiment.

As noted above, export domain keys used by cryptography service may be rotated at various times. FIG. 7 shows an illustrative example of a process 700 for maintaining a set of export domain keys and enforcing rules on export domain key rotation. The process 700 may be performed by any suitable system such as by each security module in the cryptography service or in other computer systems such as a computer system in the cryptography service having a role of enforcing key rotation roles. In an embodiment, the process 700 includes detecting 702 an export domain key rotation trigger. The export domain key rotation trigger may be an event whose occurrence causes additional operations of the process 700 to be performed. In some examples, the export domain key rotation trigger is a clock reaching a certain value. In other examples, the trigger may be receipt of a command from another computer system. Other triggers may also be used in accordance with various embodiments. For example, a counter which counts or approximates a count of times an export domain key was used in a cryptographic operation may be a trigger when the count exceeds a threshold. Other triggers are also considered as being within the scope of the present disclosure.

Having detected 702 the export domain key rotation trigger, a system performing the process 704 may select 704 a set of expired export domain keys. A data structure, such as the data structure described above in connection with FIG. 3, or variations thereof, may be referenced to identify any export domain keys that have expired. Once the set of export domain keys that have expired has been selected 704, a system performing the process 700 may cause 706 access to any expired export domain key to be lost. The manner by which access to any expired export domain keys is caused 706 to be lost, may vary in accordance with various embodiments. In some examples, one or more memory locations are used to store an export domain key that has expired. The one or more memory locations that store the expired export domain key may be overwritten with random or nonrandom data. As another example, such memory may be de-allocated such that the memory can be overwritten by any other processes that utilize memory such that, after the passage of a particular amount of time (e.g., an hour or a day), there is a high probability that the one or more memory locations will have been overwritten. Generally, any way by which access to expired export domain keys can be lost is considered as being within the scope of the present disclosure.

As illustrated in FIG. 7, the process 700 also includes generating 708 a set of replacement export domain keys to replace the set of expired export domain keys. A replacement export domain key may be generated in various ways in accordance with various embodiments. In some examples, a replacement export domain key is generated using a pseudorandom number generator. Other ways of generating replacement export domain keys include use of key derivation functions and/or other operations. Generally, any way by which a cryptographic key may be generated is considered as being within the scope of the present disclosure.

An identifier for reach replacement export domain key may be determined 710. The manner by which the identifier is determined for a replacement export domain key may vary in accordance with various implementations. For example, in some instance, identifiers of export domain keys are sequence values and an identifier may be selected as a next unused sequence value in a sequence that is used. The sequence may be, for example, an integer sequence. An expiration for each replacement export domain key may also be determined 712. The expiration may be determined 712 in various ways, in accordance with various embodiments. As an illustrative example, a specified amount of time may be added to an expiration of an export domain key that is being replaced. The specified amount of time may be, for example, 365 days although other amounts of time are considered as being within the scope of the present disclosure.

Once any replacement export domain keys that have been generated 708 have respective identifiers and expirations, the set of replacement export domain keys that was generated 708 may be stored in association with the identifiers in the expirations 714. Referring to the illustrative example of FIG. 3, for example, a row may be added to the data structure 300 for each replacement export domain key that was generated. Generally, any way by which replacement export domain keys may be stored in direct or indirect association with their identifiers and/or expirations may be used.

Figure 8:
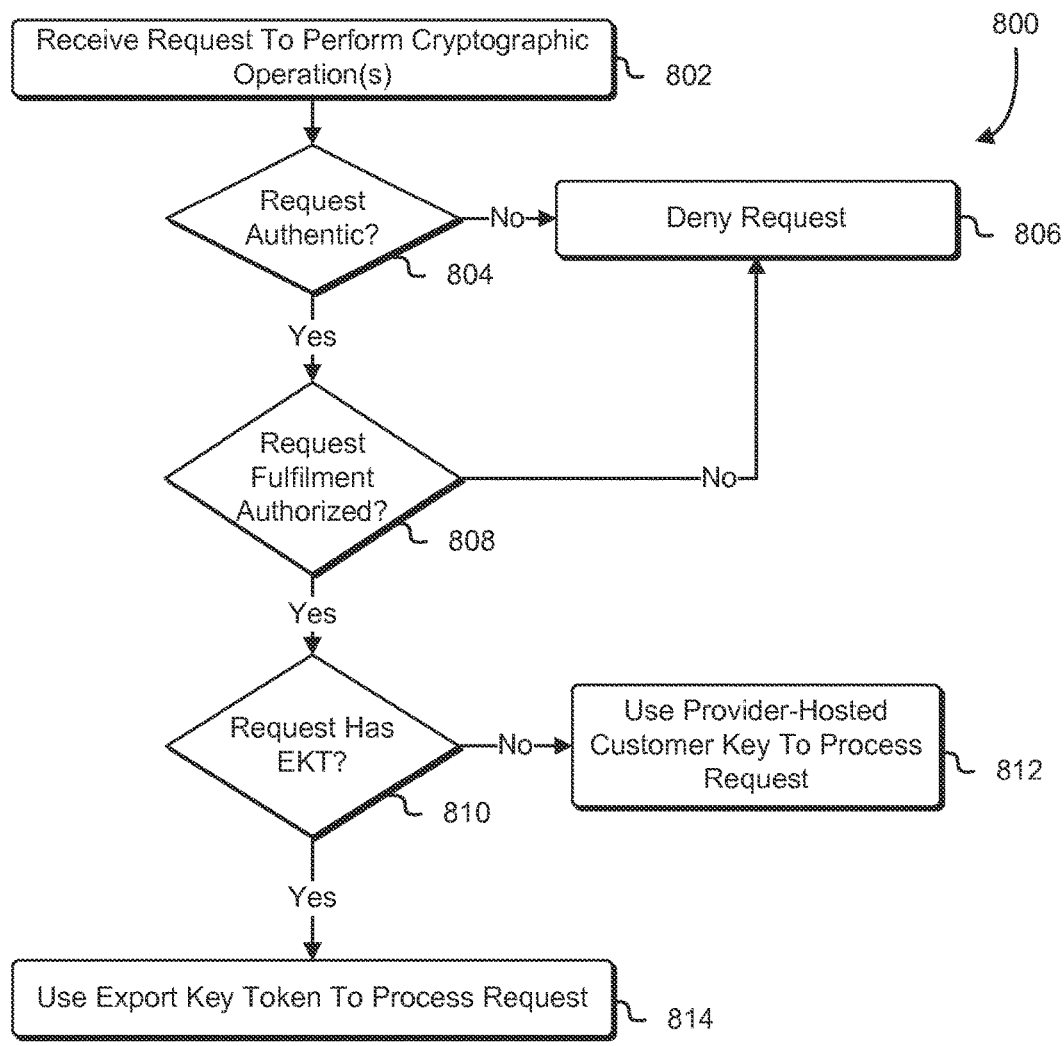
FIG. 8 shows an illustrative example of a process for fulfilling a request to perform one or more cryptographic operations in accordance with an embodiment.

As noted above, in various embodiments of the present disclosure, the cryptography service may allow customers the flexibility of using hosted cryptographic keys and customer keys encrypted in export key tokens to which the service provider loses access. FIG. 8 shows an illustrative example of a process 800 for fulfilling requests received by such a cryptography service. The process 800 may be performed by any suitable system such as by a cryptography service discussed above. The different components of the cryptography service may perform different operations of the process 800 such as in ways discussed below. In an embodiment, the process 800 includes receiving 802 a request to perform on or more cryptographic operations. The request may be received 802 in various ways, such as described above. The request, for instance, may be received 802 by a web server of a cryptography service front end, such as described above.

Having received 802 the request, the process may include determining 804 whether the request is authentic and determining 808 whether fulfillment of the request is authorized, such as discussed above. If it is determined 804 the request is not authentic (i.e., if unable to verify authenticity of the request), the process 800 may include denying 806 the request. Similarly, if it is determined 808 that fulfillment of the request is not authorized, the process 800 may include denying the request.

If the system performing the process 800 determines that the request is both authentic and that fulfillment of the request is authorized, the process 800 may include determining 810 whether the request includes an export key token. As noted above, export key tokens may be provided optionally in parameters of requests to perform one or more cryptographic operations. Accordingly, determining 810 whether the request has an export key token may include parsing the request and determining whether such export key token was included as a parameter of the request. A web server of a frontend of a cryptography service may, for instance, determine whether the request included an export key token.

If it is determined 810 that the request does not have an export key token, the process 800 may include using 812 a provider hosted customer key to process the request. As an illustrative example, a web or other server of a cryptography service performing the process 800 may obtain an encrypted copy of the provider hosted customer key from a data storage location such as from a separate data storage service. Once obtained, the server may provide the encrypted copy of the provider hosted customer key to a security module. Note that the request may comprise an identifier of the provider hosted customer key that the system performing the process 800 uses to select the provider hosted customer key from multiple provider hosted customer keys hosted for multiple customers. Other ways of determining the provider hosted customer key may also be used, such as when a customer has a default provider hosted customer key that does not need to be specified specifically with an identifier.

Once provided to the security module, the security module may use a domain key to decrypt the encrypted copy to obtain the provider hosted customer key in plaintext form. The security module may then use the provider hosted customer key to perform the one or more cryptographic operations to fulfill the request and may provide result of the performed on or more cryptographic operations to the server for inclusion in the response to the request that was received 802. The security module may then lose access to the plaintext copy of the provider hosted customer key that the security model obtained from the encrypted copy of the provider hosted customer key.

If a system performing in the process 800 determines 810 that the request does in fact have an export key token, the system performing the process 800 may use 814 the export key token to process the request. The export key token may be used to process the request such as described above in connection with FIG. 6.

Figure 9:
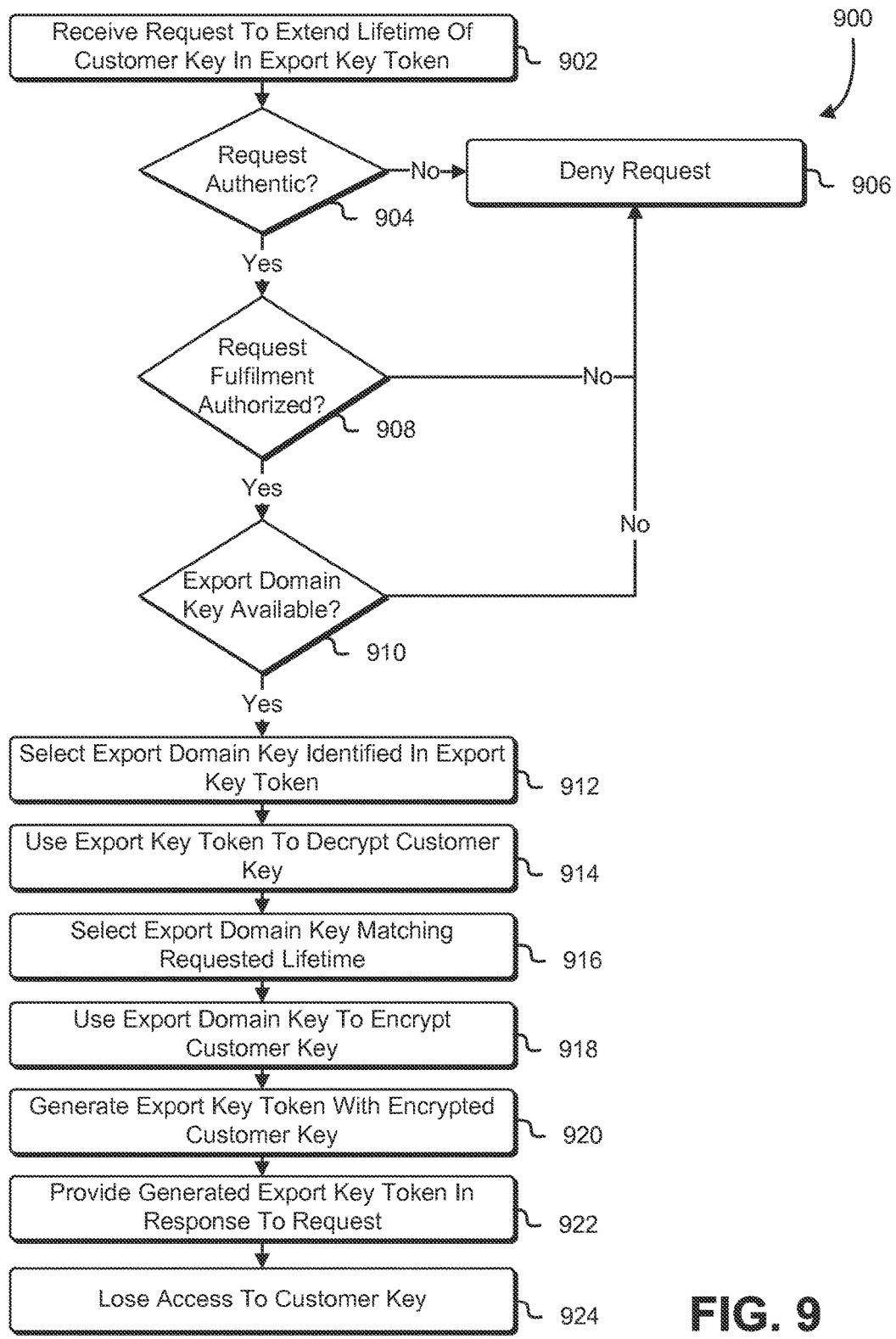
FIG. 9 shows an illustrative example of a process for fulfilling a request to extend the lifetime of an exported customer key in accordance with an embodiment.

As discussed above, when a customer requests an export key token, such requests may specify a lifetime for a customer key encrypted in the export key token that is returned as a result of fulfillment of the request. In some circumstances a customer of a service provider that utilizes export key tokens may desire to extend the life of a cryptographic key encrypted in an export key token. For example, the customer may have a need to access data at a time after expiration of the lifetime of the export key tokens cryptographic key. FIG. 9 shows an illustrative example of a process 900 for processing a request to extend the lifetime of a customer key that is encrypted in an export key token. The process 900 may be performed by any suitable system such as by a cryptography service as described above and different components of the cryptography service may perform different operations in the process 900 such as described in more detail below.

In an embodiment, the process 900 includes receiving a request to extend the lifetime of a customer key that is encrypted in an export key token. The request may be received 902 in various ways such as by a web server of a cryptography service front end such as described above in connection with the FIG. 2. As with other requests described above, the process 900 may include determining 904 whether the request was authentic and determining 908 whether fulfillment of the request is authorized. If it is determined 904 that the request is not authentic (i.e., if unable to verify authenticity of the request) or if it is determined that fulfillment of the request is not authorized, the process 900 may include denying 906 the request, such as described above.

As illustrated in FIG. 9 if a system performing the process 900 determines 904 that the request is authentic and also determines 908 that fulfillment of the request is authorized, the process 900 may include determining 910 whether an export domain key is available. An export domain key may be available, for instance, if the request is received before expiration of the cryptographic key encrypted in the export key token. Similarly, the export domain key may be unavailable if the request is received 902 after expiration of the customer key encrypted in the export key token. The determination 910 whether the export domain key is available may be performed by different components in accordance with different implementations. In some embodiments, for example, the determination 910 is made by a web or other server of the cryptography service whereas in other embodiments the determination 910 is made by a security module.

If the system performing the process 900 determines 910 that the export domain key is unavailable, the process 900 may include denying 906 the request such as described above. If, however, it is determined 910 that the export domain key is available, the export domain key may be selected 912 as the export domain key identified in the export key token. A data structure such as described above in connection with FIG. 3 may be used to select 912 the export domain key identified in the export key token. The export key token may then be used 914 to decrypt the customer key.

As noted above, export key tokens may be available only inside of authorized security modules and, consequently, selection 912 of the export domain key and decryption of the customer key in the export key token may be performed by a security module. An export domain key matching a requested lifetime specified in the request that was received 902 may be selected 916. The selection 916 may be made by a security module that references a data structure such as described above in connection with FIG. 3. The security module that selects 916 the export domain key that matches the requested lifetime may use 918 selected export domain key to encrypt the customer key.

Once the customer key encrypted under the export domain key that was selected 916 is obtained, the process 900 may include generating 920 an export key token with the encrypted customer key. Generation of the export key token may occur by the security module that encrypted the customer key or by a server. For example, in some implementations, the export key token is digitally signed by a security module using the cryptographic key that is inaccessible outside a fleet of authorized security modules. As a result, security modules may be responsible for generation 920 of export key tokens. If a security module generates 920 the export key token, the security module may provide the export key token to a web server of a front end of the cryptography service performing the process 900. Regardless of how the web server of the front end obtains the export key token, the web server may provide 922 the generated export key token in response to the request. As with other processes described herein, at a time after the customer key is no longer needed for the performance of any cryptographic operations, the process 900 may include losing 924 access to the customer key, such as described above.

Figure 10:
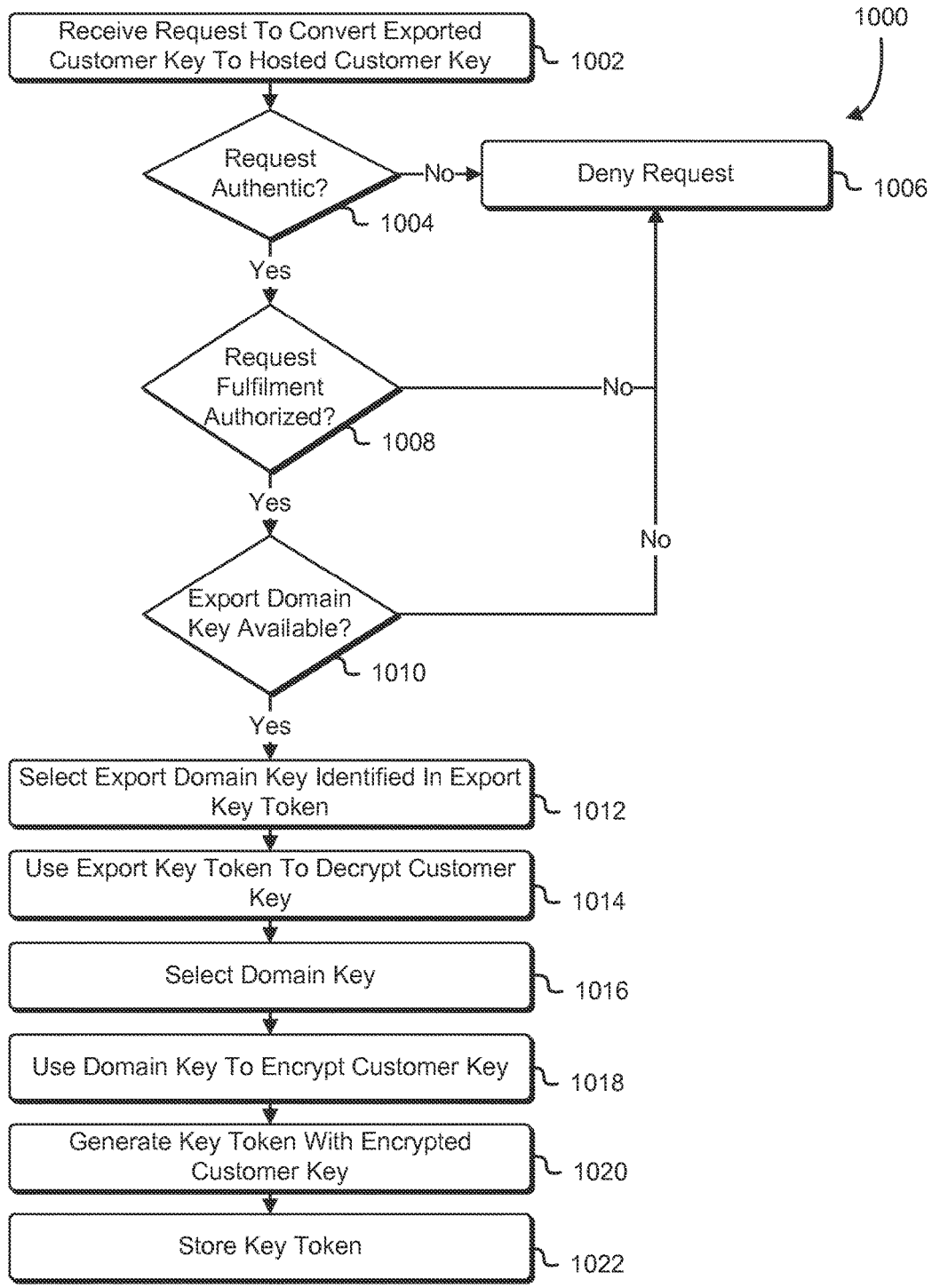
FIG. 10 shows an illustrative example of a process for fulfilling a request to convert an exported customer key to a hosted customer key in accordance with an embodiment.

In some examples, a customer of the service provider may utilize export key tokens to allow a service provider limited access to its customer keys. For instance, the customer may begin to trust the service provider more and/or may desire to have additional services performed by the service provider to lessen the burden of the customer maintaining its own computing resources. FIG. 10 shows an illustrative example of a process 1000 for processing a request to convert an exported customer key to a hosted customer key. The process 1000 may be performed by any suitable system, such as by a cryptography service described above and different components of the cryptography service may perform different operations of the process 1000. In an embodiment, the process 1000 includes receiving 1002 a request to convert an exported customer key to a hosted customer key. The request may be received 1002 by a web server of a front end of a cryptography service such as described above. The request may include, for instance, an export key token as a parameter of the request that is received 1002. As with other processes described above that involve requests to perform various operations involving export key tokens, the process 1000 may include determining 1004 whether the request is authentic, determining 1008 whether fulfillment of the request is authorized, and determining 1010 whether a suitable export domain key is available such as described above.

A suitable export domain key may be an export domain key that can be used to obtain a plaintext copy of the customer key from the export key token that is received in the request. If it is determined that either the request is not authentic (i.e., if unable to verify authenticity of the request), that fulfillment of the request is not authorized, or that a suitable export domain key is unavailable, the process 1000 may include denying 1006 the request. If, however, it is determined 1004 that the request is authentic, determined 1008 that fulfillment of the request is authorized, and determined 1010 that a suitable export domain key is available, a system performing the process 1000 may select 1012 the export domain key identified in the export key token that was received in the request.

As discussed above, selection of the export domain key may be performed by a security module or a web or other service of the cryptography service performing the process 1000. A security module of the cryptography service performing the process 1000 may use 1014 the export key token to decrypt the customer key. The security module may then select 1016 a domain key which may be cryptographic key which the security module is configured to use for hosted customer keys, such as a cryptographic key that has a shorter rotation schedule than at least some export domain keys. The security module may then use 1018 the domain key to encrypt the customer key. The security module or a web or other server of the cryptography service may generate 1020 a key token with the encrypted customer key. The key token may be structured such as an export key token described above in connection with FIG. 4. In some implementations, the key token is structured as the export key token 402 described above in connection with FIG. 4, except that the key token may lack an internal customer identifier 404, although some implementations allow for the use of internal customer key identifiers for hosted customer keys.

After the security module generates 1020 the key token, the security module may provide the key token to a web server of the cryptography service that received 1002 the request to enable the web server to store 1022 the key token that was generated 1020. In some examples, the web server transmits a request to a data storage service to cause the data storage service to store the key token using computing resources such as data storage devices of the data storage service. Generally, anyway by which the key token may be stored in hardware hosted by and/or controlled by the service provider whose cryptography service performs the process 1000 is considered as being within the scope of the present disclosure. Note also that in some embodiments the security module may transmit a request to the data storage service itself and provide a notification of such storage to the web server to provide a response to the request indicating that the request has been fulfilled. Further, in some alternate embodiments, the security module may not generate a key token but may store the key token in its own local memory that is inaccessible outside of the security module. A secured transfer between security modules may be performed to enable multiple security modules to have access to the customer key in such alternate embodiments.

Figure 11:
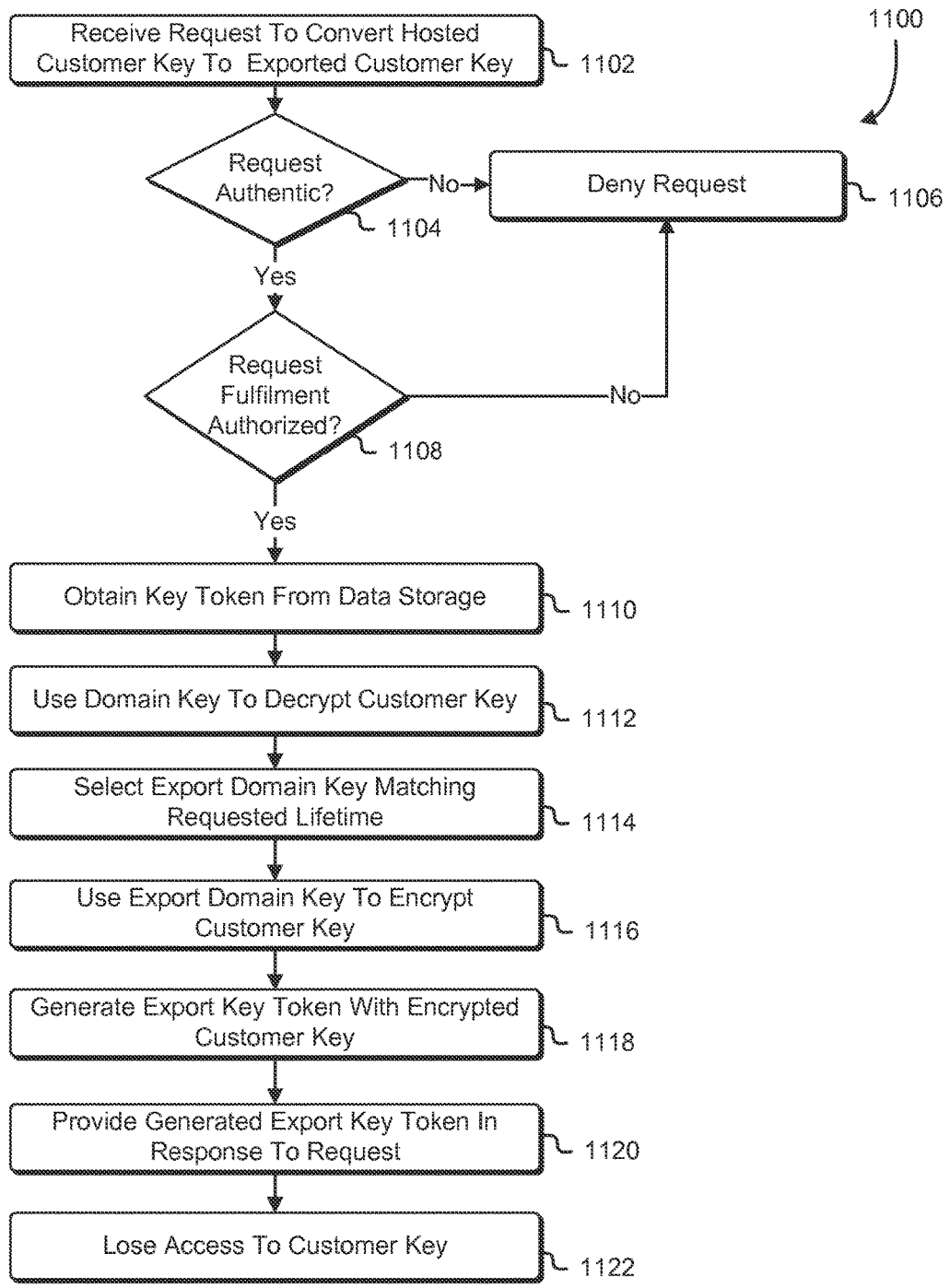
FIG. 11 shows an illustrative example of a process for fulfilling a request to convert a hosted customer key to an exported customer key in accordance with an embodiment.

In some examples, customers of the service provider may desire conversion of their hosted customer keys to exported customer keys for various reasons. FIG. 11, accordingly, shows an illustrative example of a process 1100 for processing a request to convert a hosted customer key to an exported customer key. The process 1100 may be performed by any suitable system, such as a cryptography service as described above. In an embodiment, the process 1100 includes receiving 1102 a request to convert a hosted customer key to an exported customer key. The request may be received 1102 by a web server of a front end of the cryptography service performing the process 1100. The request may include as a parameter an identifier of the hosted customer key that is useable to distinguish the hosted customer key from other hosted customer keys hosted by the service provider. As with other processes described herein, the process 1100 may include determining 1104 whether the request is authentic, and determining 1108 whether fulfillment of the request is authorized. If it is not determined 1104 that the request is authentic or if it is determined 1108 that fulfillment of the request is not authorized, the process 1100 may include denying 1106 the request.

If, however, it is both determined 1104 that the request is authentic and determined 1108 that fulfillment of the request is authorized, the process 1100 may include obtaining 1110 a key token from data storage where the key token comprises an encrypted copy of the hosted customer key specified in the request that was received 1102. As with many operations described herein that do not involve access to plaintext copies of customer keys, the key token may be obtained 1110 by different components in accordance with different embodiments, such as by a web or other server of the cryptography service performing the process 1100 or a security module thereof.

Regardless of how the key token is obtained 1110 from data storage, the key token may be obtained by a security module of the cryptography service performing the process 1100. Accordingly, as illustrated in FIG. 11, a security module may use 1112 a domain key to decrypt the customer key. The security module may select 1114 an export domain key matching a lifetime specified as a parameter in the request that was received 1102 or implicitly specified (e.g., as a default) and may use 1116 the selected export domain key to encrypt the customer key. A suitable component such as described above may generate 1118 an export key token with the encrypted customer key.

The export key token that is generated 1118 may be configured such as described above in connection with FIG. 4 and may include, for instance, various identifiers such as described above where the internal customer key identifier 404 may be specified as a parameter of the request that is received 1102. A web server of a front end of a cryptography service performing the process 1100 may provide 1120 the generated export key token in response to the request. As with other processes described herein, when a plaintext copy of the customer key is no longer necessary, the process 1100 may include losing 1122 access to the customer key, such as described above.

FIGS. 5 through 11 illustrate various processes that may be performed by a cryptography service or other computer system. The processes show various operations performed in a particular order. It should be noted that the order of operations may differ from that which is illustrated such as when the performance of one operation is not dependent on the other. For example, determinations of request authenticity and authorization of request fulfillment may be performed in a different order or in parallel. Other pairs of operations not required to be performed in a particular order such as when the output of one operation is not used as input to the other, may be performed in an order different than illustrated or in parallel. As an illustrative example, numerous processes described herein include performing a set of operations that cause a cryptography service to lose access to any plaintext copies of a customer key. In all processes illustrated in the drawings, the set of operations that cause access to be lost occurs at the end of the processes. However, the operations that causes the system to lose access may be performed at any suitable point in time, such as after which any operations performed on or otherwise using the plaintext copy of the customer key have completed. Other variations are also considered as being within the scope of the present disclosure.

For example, in some embodiments, expiration of an export domain key causes a complete loss of access to the export domain key, rendering information (e.g., customer keys) encrypted under the export domain key irretrievable absent extraordinary computational effort. In some embodiments, a service provider may allow for retrieval of an export domain key past its expiration, such as to allow for recovery of data past the lifetime of the export domain key. The service provider may, for instance, maintain a copy of the export domain key in an offline repository for a limited time past the expiration of the export domain key such that the export domain key can be retrieved to decrypt information while the copy of the export domain key is retrievable from the offline repository. As another example, a private cryptographic key may be maintained in an offline repository (e.g., in a safe in a locked room in a data center or other location). A corresponding public key may be used to encrypt a copy of the export domain key and the encrypted copy may be stored in a data storage system. At a later point in time, the private cryptographic key may be accessed and destroyed, thereby removing any potential ability to recover the export domain key. Other variations are also considered as being within the scope of the present disclosure.

As discussed, numerous variations of the present disclosure involve performing various cryptographic operations, which may utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data.

Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Figure 12:
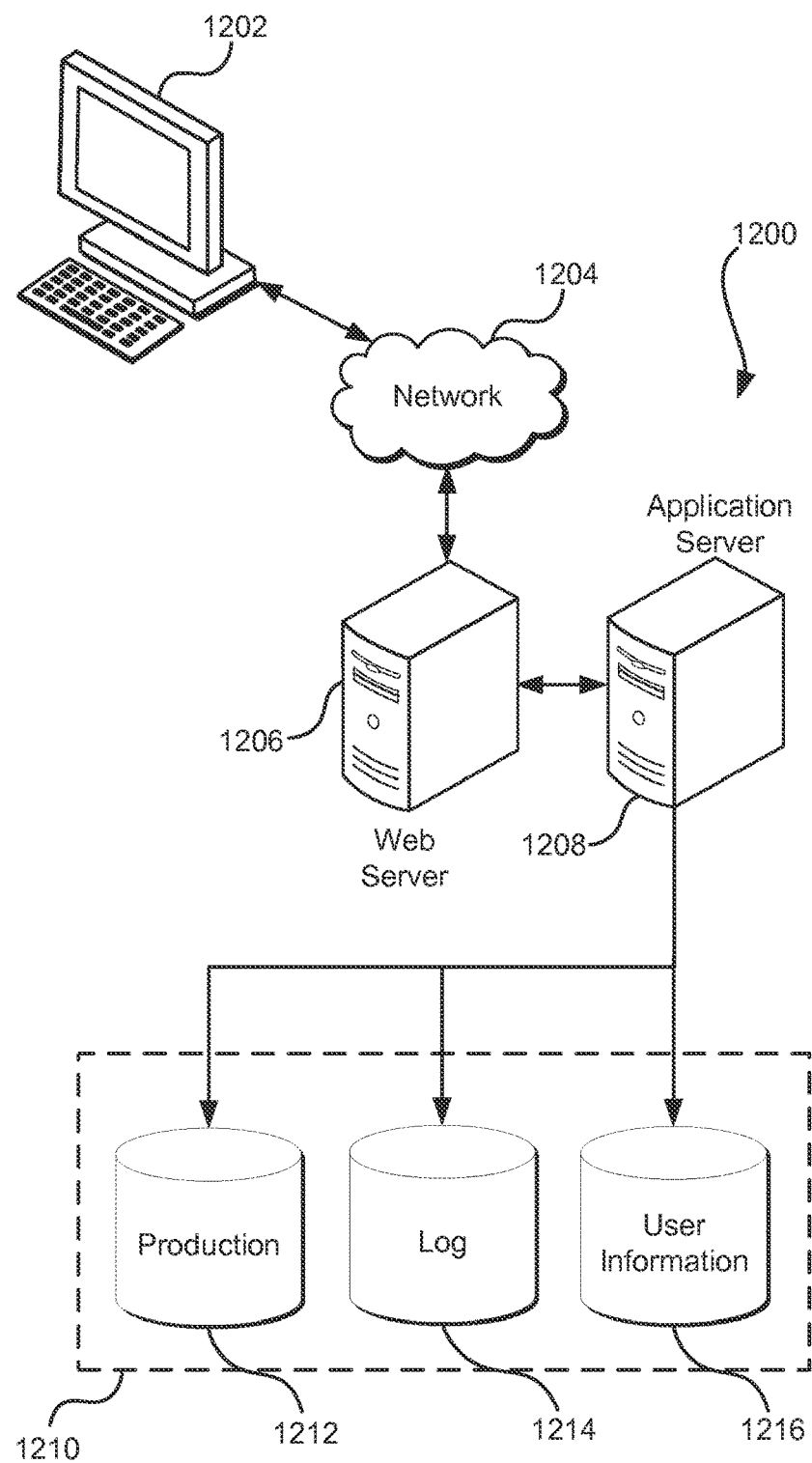
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases; can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   selecting a first cryptographic key with an expiration that matches a lifetime specified in a request;
   providing, in response to the request, an encrypted second cryptographic key generated by encrypting a second cryptographic key using the first cryptographic key; and
   after providing the encrypted second cryptographic key, performing one or more operations to lose information to prevent an ability to obtain the second cryptographic key until another request that includes the encrypted second cryptographic key is later obtained.

2. The computer-implemented method of claim 1, further comprising associating a policy with an identifier of the second cryptographic key such that a cryptography service uses the policy to control fulfillment of requests to perform cryptographic operations using the second cryptographic key.

3. The computer-implemented method of claim 1, further comprising:
   receiving, at a web server of a cryptography service, a second request for a hosted cryptographic key;

generating, in a device that provides hardware protection of cryptographic material, the hosted cryptographic key;

encrypting, using a third cryptographic key stored in the device, the hosted cryptographic key; and storing the encrypted hosted cryptographic key in a location accessible to the cryptography service.

4. The computer-implemented method of claim 3, wherein:

the first cryptographic key is selected from a first subset of a set of first cryptographic keys within the device; and the third cryptographic key is from a second subset of the set of first cryptographic keys provisioned for hosted cryptographic keys.

5. A system, comprising memory to store instructions that, as a result of execution by one or more processors, cause the system to:

encrypt a cryptographic key using cryptographic material inaccessible outside of a set of hardware devices that each provide hardware protection of the cryptographic material, the cryptographic material including an expiration corresponding to a time after which the cryptographic material becomes inaccessible, the expiration matching a lifetime specified in a request;

provide the encrypted cryptographic key; and lose access to information to cause the system to be unable to obtain copies of the cryptographic key until another request that includes the encrypted cryptographic key is later obtained.

6. The system of claim 5, wherein:

the instructions, as a result of execution by the one or more processors, further cause the system to generate a token that comprises an identifier of the cryptographic key; and provide the encrypted cryptographic key includes providing the generated token.

7. The system of claim 5, wherein the instructions, as a result of execution by the one or more processors, further cause the system to:

receive a second request to perform a cryptographic operation using the cryptographic key, the second request comprising the encrypted cryptographic key; and fulfill the second request by, contingent on the cryptographic material still being available, decrypting the encrypted cryptographic key and performing the cryptographic operation using the cryptographic key.

8. The system of claim 7, wherein the instructions, as a result of execution by the one or more processors, further cause the system to:

receive a third request to perform the cryptographic operation, the third request specifying an identifier of a second cryptographic key;

obtain, from a data storage location, an encrypted copy of the second cryptographic key;

decrypt the encrypted copy of the second cryptographic key; and use the second cryptographic key to perform the cryptographic operation.

9. The system of claim 5, wherein the instructions, as a result of execution by the one or more processors, further cause the system to:

associate a policy with the cryptographic key, the policy specifying a set of permissions for the cryptographic key; and control fulfillment of requests to use the cryptographic key in accordance with the policy.

10. The system of claim 5, wherein the instructions, as a result of execution by the one or more processors, further cause the system to select the cryptographic material based at least in part on an expiration of the cryptographic material, the expiration indicating a time after which the system will lose access to the cryptographic material.

11. The system of claim 5, wherein the hardware devices are hardware security modules.

12. The system of claim 5, wherein the instructions, as a result of execution by the one or more processors, further cause the system to:

retrieve an encrypted copy of the cryptographic key from a data storage system; and decrypt the encrypted copy of the cryptographic key using other cryptographic material different from the cryptographic material.

13. A non-transitory computer-readable storage medium comprising executable instructions that, as a result of being executed by one or more processors of a computer system, cause the computer system to at least:

obtain a key token comprising an encrypted copy of a first cryptographic key and information usable to identify a second cryptographic key including an expiration that matches a lifetime specified in a request;

cause access to information usable to determine the first cryptographic key to be lost after the key token is generated until another request that includes the key token is later obtained; and if the second cryptographic key has not expired, derive the first cryptographic key from the key token and use the derived first cryptographic key to perform one or more cryptographic operations.

14. The non-transitory computer-readable storage medium of claim 13, wherein the executable instructions to obtain the key token, as a result of being executed by the one or more processors, cause the computer system to obtain the key token as a result of receipt of the request.

15. The non-transitory computer-readable storage medium of claim 13, wherein the executable instructions to obtain the key token, as a result of being executed by the one or more processors, cause the computer system to issue a command to a device of a set of devices to cause generation of the key token.

16. The non-transitory computer-readable storage medium of claim 13, wherein the executable instructions that, as a result of being executed by the one or more processors, further cause the computer system to:

determine, based at least in part on an identifier of the first cryptographic key, a set of policies defining a set of permissions for using the first cryptographic key;

determine whether fulfillment of a second request complies with the determined set of policies; and derive the first cryptographic key from the key token and use the derived first cryptographic key to perform the one or more cryptographic operations is contingent on determining that fulfillment of the second request complies with the determined set of policies.

17. The non-transitory computer-readable storage medium of claim 13, wherein the expiration of the second cryptographic key indicates a time after which the second cryptographic key becomes inaccessible to a set of hardware devices that manages the second cryptographic key.

18. The non-transitory computer-readable storage medium of claim 13, wherein the executable instructions that cause the computer system to derive the first cryptographic key from the key token, as a result of being executed by the one or more processors, cause the computer system to determine the key token from a second request.

19. The non-transitory computer-readable storage medium of claim 13, wherein the information usable to determine the first cryptographic key is the first cryptographic key.

20. The non-transitory computer-readable storage medium of claim 13, wherein the executable instructions that, as a result of being executed by the one or more processors, further cause the computer system to provide a response to a second request that is based at least in part on a result of the one or more cryptographic operations.

* * * * *